United States Patent
Tokuoka et al.

(10) Patent No.: US 11,186,685 B2
(45) Date of Patent: Nov. 30, 2021

(54) EMULSION OF NITROGEN ATOM-CONTAINING POLYMER OR SALT THEREOF, PRODUCTION METHOD THEREFOR, AND PRODUCTION METHOD FOR PARTICLES

(71) Applicant: FUJIFILM Corporation, Tokyo (JP)

(72) Inventors: Shinsuke Tokuoka, Ashigarakami-gun (JP); Hayato Yoshida, Ashigarakami-gun (JP); Katsuhiro Shimono, Ashigarakami-gun (JP); Takayuki Ito, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/455,091

(22) Filed: Jun. 27, 2019

(65) Prior Publication Data
US 2019/0315932 A1   Oct. 17, 2019

Related U.S. Application Data

(63) Continuation of application No. PCT/JP2017/047178, filed on Dec. 28, 2017.

(30) Foreign Application Priority Data

Dec. 28, 2016  (JP) .............................. JP2016-255554
Oct. 16, 2017  (JP) .............................. JP2017-200011

(51) Int. Cl.
| | |
|---|---|
| *C08J 3/09* | (2006.01) |
| *B29B 9/12* | (2006.01) |
| *C08J 3/24* | (2006.01) |
| *C08K 5/00* | (2006.01) |
| *C08L 1/26* | (2006.01) |
| *B29B 9/16* | (2006.01) |

(52) U.S. Cl.
CPC ................ *C08J 3/092* (2013.01); *B29B 9/12* (2013.01); *C08J 3/095* (2013.01); *C08J 3/098* (2013.01); *C08J 3/24* (2013.01); *C08K 5/0025* (2013.01); *C08L 1/26* (2013.01); *B29B 2009/125* (2013.01); *B29B 2009/166* (2013.01); *C08J 2339/00* (2013.01)

(58) Field of Classification Search
CPC .............. B29B 9/12; B29B 2009/125; B29B 2009/166; C08J 3/095; C08J 3/098; C08J 3/24; C08J 2339/00; C08K 5/0025; C08L 1/26
USPC ......................................................... 524/35
See application file for complete search history.

(56) References Cited

U.S. PATENT DOCUMENTS

| | | | |
|---|---|---|---|
| 4,605,701 A * | 8/1986 | Harada ..................... | C08F 8/00 525/107 |
| 4,799,962 A | 1/1989 | Ahmed | |
| 5,496,545 A | 3/1996 | Holmes-Farley et al. | |
| 5,496,845 A | 3/1996 | Martin et al. | |
| 6,180,754 B1 | 1/2001 | Stutts et al. | |
| 6,362,266 B1 | 3/2002 | Buchholz et al. | |
| 6,383,518 B1 | 5/2002 | Matsuda et al. | |
| 6,482,872 B2 | 11/2002 | Downie | |
| 6,525,113 B2 | 2/2003 | Klix et al. | |
| 6,565,768 B1 | 5/2003 | Dentler et al. | |
| 6,696,087 B2 | 2/2004 | Matsuda et al. | |
| 6,710,162 B2 | 3/2004 | Rea | |
| 6,733,780 B1 | 5/2004 | Tyler et al. | |
| 6,806,350 B2 | 10/2004 | Stanek et al. | |
| 7,067,614 B2 | 6/2006 | Rea | |
| 7,229,613 B2 | 6/2007 | Burke et al. | |
| 7,261,880 B2 | 8/2007 | Burke et al. | |
| 7,271,237 B2 | 9/2007 | Rea | |
| 7,275,928 B2 | 10/2007 | Kolesar et al. | |
| 7,388,056 B2 | 6/2008 | Gopalkrishna et al. | |
| 7,449,605 B2 | 11/2008 | Chang et al. | |
| 7,459,502 B2 | 12/2008 | Connor et al. | |
| 7,541,024 B2 | 6/2009 | Petersen et al. | |
| 7,592,417 B2 | 9/2009 | Rea | |

(Continued)

FOREIGN PATENT DOCUMENTS

| | | |
|---|---|---|
| CN | 102942646 A | 2/2013 |
| CN | 103 111 247 A | 5/2013 |

(Continued)

OTHER PUBLICATIONS

Translation of JP2004-059747 (Patents Application 2002-220546), Feb. 26, 2004. (Year: 2004).*
Extended European Search Report (EESR) dated Dec. 6, 2019 from the European Patent Office in European application No. 17888776.6.
Office Action dated Dec. 23, 2019 from the United States Patent and Trademark Office in co-pending, subject matter-related U.S. Appl. No. 16/457,338.
Office Action dated Apr. 3, 2020 from the U.S. Patent and Trademark Office in co-pending U.S. Appl. No. 16/457,338.
Office Action dated Nov. 22, 2019 in Australian Application No. 2017388956.

(Continued)

*Primary Examiner* — Hui H Chin
(74) *Attorney, Agent, or Firm* — Sughrue Mion, PLLC

(57) ABSTRACT

An emulsion of a nitrogen atom-containing polymer or salt thereof and a method for producing it are provided. The emulsion has high stability and low dispersity of the particle diameter of emulsified particles. A method for producing particles including a crosslinked nitrogen atom-containing polymer or sat thereof using the emulsion is also provided. The method for producing the emulsion includes a step of mixing a first solution that includes a nitrogen atom-containing polymer or salt thereof and a hydrophilic solvent and has a viscosity of 10 to 2,000 mPa·s, and a second solution that includes a hydrophobic solvent and has a viscosity of 1 to 100 mPa·s, stirring the mixture, and thus obtaining an emulsion of the nitrogen atom-containing polymer or salt thereof, wherein a ratio between the viscosity of the first and second solutions is in a range of 0.1:1 to 300:1.

10 Claims, No Drawings

(56) References Cited

U.S. PATENT DOCUMENTS

| | | | |
|---|---|---|---|
| 7,608,674 B2 | 10/2009 | Connor et al. | |
| 7,846,425 B2 | 12/2010 | Hegde et al. | |
| 7,879,972 B2 | 2/2011 | Rea | |
| 7,943,597 B2 | 5/2011 | Lewis et al. | |
| 7,964,182 B2 | 6/2011 | Omray et al. | |
| 8,187,631 B2 | 5/2012 | Tyler et al. | |
| 8,187,634 B2 | 5/2012 | Hegde et al. | |
| 8,198,399 B2 | 6/2012 | Rea | |
| 8,377,428 B2 | 2/2013 | Petersen et al. | |
| 8,378,036 B2 | 2/2013 | Rea | |
| 8,389,640 B2 | 3/2013 | Singh et al. | |
| 8,394,416 B2 | 3/2013 | Bianchi et al. | |
| 8,846,784 B2 | 9/2014 | Gaberlein et al. | |
| 9,181,364 B2 | 11/2015 | Kopping et al. | |
| 9,205,107 B2 | 12/2015 | Klaerner et al. | |
| 9,579,343 B2 | 2/2017 | Tyler et al. | |
| 9,925,214 B2 | 3/2018 | Klaerner et al. | |
| 9,931,358 B2 | 4/2018 | Tyler et al. | |
| 9,993,500 B2 | 6/2018 | Klaerner et al. | |
| 10,272,103 B2 | 4/2019 | Kopping et al. | |
| 2001/0027225 A1 | 10/2001 | Downie | |
| 2001/0041756 A1 | 11/2001 | Klix et al. | |
| 2002/0122786 A1 | 9/2002 | Matsuda et al. | |
| 2002/0128429 A1 | 9/2002 | Rea | |
| 2002/0159968 A1 | 10/2002 | Petersen et al. | |
| 2002/0168333 A1 | 11/2002 | Burke | |
| 2002/0182168 A1 | 12/2002 | Holmes-Farley | |
| 2002/0187120 A1 | 12/2002 | Holmes-Farley et al. | |
| 2002/0187121 A1 | 12/2002 | Burke | |
| 2003/0039627 A1 | 2/2003 | Holmes-Farley et al. | |
| 2003/0049226 A1 | 3/2003 | Burke et al. | |
| 2004/0006201 A1 | 1/2004 | Stanek et al. | |
| 2004/0059065 A1 | 3/2004 | Goto et al. | |
| 2004/0166156 A1 | 8/2004 | Tyler et al. | |
| 2004/0194334 A1 | 10/2004 | Rea | |
| 2005/0131138 A1 | 6/2005 | Connor et al. | |
| 2005/0147580 A1 | 7/2005 | Connor et al. | |
| 2006/0034914 A1 | 2/2006 | Tyler et al. | |
| 2006/0110488 A1 | 5/2006 | Saikin | |
| 2006/0223982 A1 | 10/2006 | Rea | |
| 2006/0258812 A1 | 11/2006 | Gopalkrishna et al. | |
| 2007/0190135 A1 | 8/2007 | Matsuda et al. | |
| 2007/0286841 A1 | 12/2007 | Burke et al. | |
| 2008/0085872 A1 | 4/2008 | Burke et al. | |
| 2008/0112918 A1 | 5/2008 | Holmes-Farley et al. | |
| 2008/0132677 A1 | 6/2008 | Rea | |
| 2008/0166317 A1 | 7/2008 | Keller et al. | |
| 2009/0155368 A1 | 6/2009 | Holmes-Farley et al. | |
| 2009/0162314 A1 | 6/2009 | Huval et al. | |
| 2009/0280178 A1 | 11/2009 | Hedge et al. | |
| 2009/0291135 A1 | 11/2009 | Tyler et al. | |
| 2010/0068167 A1 | 3/2010 | Petersen et al. | |
| 2010/0083523 A1 | 4/2010 | Rea | |
| 2010/0092421 A1 | 4/2010 | Hedge et al. | |
| 2010/0183732 A1 | 7/2010 | Bianchi et al. | |
| 2010/0189679 A1 | 7/2010 | Inoue et al. | |
| 2010/0234490 A1 | 9/2010 | Gaberlein et al. | |
| 2010/0305302 A1 | 12/2010 | Rea | |
| 2010/0330175 A1 | 12/2010 | Jobdevairakkam | |
| 2011/0028660 A1* | 2/2011 | Singh | A61K 31/74 525/385 |
| 2011/0064820 A1 | 3/2011 | Omray et al. | |
| 2011/0201760 A1 | 8/2011 | Rea | |
| 2012/0196988 A1 | 8/2012 | Gaboardi et al. | |
| 2012/0220731 A1 | 8/2012 | Rea | |
| 2012/0322894 A1 | 12/2012 | Tyler et al. | |
| 2013/0022570 A1 | 1/2013 | Kopping et al. | |
| 2013/0123433 A1 | 5/2013 | Liu et al. | |
| 2013/0189215 A1 | 7/2013 | Lees et al. | |
| 2014/0091034 A1 | 4/2014 | Ichinose et al. | |
| 2015/0056278 A1 | 2/2015 | Tyler et al. | |
| 2015/0056451 A1 | 2/2015 | Klaerner et al. | |
| 2015/0329842 A1 | 11/2015 | Cascao-Pereira et al. | |
| 2016/0051576 A1 | 2/2016 | Kopping et al. | |
| 2016/0074430 A1 | 3/2016 | Klaerner et al. | |
| 2017/0183425 A1 | 6/2017 | Ishii et al. | |
| 2017/0202872 A1 | 7/2017 | Tyler et al. | |
| 2018/0015119 A1 | 1/2018 | Kumar et al. | |
| 2018/0015121 A1 | 1/2018 | Klaerner et al. | |
| 2018/0021370 A1 | 1/2018 | Klaerner et al. | |
| 2018/0280428 A1 | 10/2018 | Klaerner et al. | |
| 2019/0315932 A1 | 10/2019 | Tokuoka et al. | |
| 2019/0321393 A1 | 10/2019 | Tokuoka et al. | |

FOREIGN PATENT DOCUMENTS

| | | |
|---|---|---|
| CN | 103724518 A | 4/2014 |
| CN | 102942646 B | 6/2016 |
| EP | 0 143 328 A2 | 6/1985 |
| EP | 0 322 736 A2 | 7/1989 |
| EP | 0 143 328 B1 | 6/1990 |
| EP | 0 322 736 B1 | 4/1993 |
| EP | 0 964 894 A1 | 12/1999 |
| EP | 0 997 148 A1 | 5/2000 |
| EP | 0 716 606 B1 | 8/2001 |
| EP | 1 133 989 A2 | 9/2001 |
| EP | 1 153 940 A1 | 11/2001 |
| EP | 1 304 104 A2 | 4/2003 |
| EP | 0 997 148 B1 | 7/2003 |
| EP | 1 123 330 B1 | 3/2004 |
| EP | 1 319 029 B1 | 1/2005 |
| EP | 1 133 989 B1 | 5/2006 |
| EP | 1 379 258 B1 | 6/2006 |
| EP | 1 676 581 A2 | 7/2006 |
| EP | 1 304 104 B1 | 6/2007 |
| EP | 1 175 451 B1 | 7/2007 |
| EP | 1 416 942 B1 | 12/2007 |
| EP | 1 881 013 A1 | 1/2008 |
| EP | 1 442 073 B1 | 3/2008 |
| EP | 1 392 331 B1 | 4/2008 |
| EP | 1 918 318 A1 | 5/2008 |
| EP | 1 923 064 A2 | 5/2008 |
| EP | 2 016 947 A1 | 1/2009 |
| EP | 1 214 359 B1 | 3/2009 |
| EP | 1 918 318 B1 | 2/2010 |
| EP | 2 172 204 A1 | 4/2010 |
| EP | 2175866 A1 | 4/2010 |
| EP | 2 441 779 A1 | 4/2012 |
| EP | 2 481 414 A1 | 8/2012 |
| EP | 2 719 730 A1 | 4/2014 |
| EP | 2 539 380 B1 | 8/2015 |
| EP | 2 998 329 A2 | 3/2016 |
| EP | 3003327 A1 | 4/2016 |
| EP | 2 538 947 B1 | 8/2016 |
| EP | 3 130 343 A1 | 2/2017 |
| EP | 1 923 064 B1 | 6/2017 |
| EP | 3 287 133 A1 | 2/2018 |
| EP | 3 130 343 B1 | 5/2018 |
| EP | 3 287 133 B1 | 4/2019 |
| EP | 3 564 292 A1 | 11/2019 |
| EP | 3 698 798 A1 | 8/2020 |
| JP | S61-051006 A | 3/1986 |
| JP | S63-045721 B2 | 9/1988 |
| JP | H04-008710 A | 1/1992 |
| JP | 10-330269 A | 12/1998 |
| JP | 10-330427 A | 12/1998 |
| JP | 2001-516787 A | 10/2001 |
| JP | 2004-059747 * | 2/2004 |
| JP | 2004-059747 A | 2/2004 |
| JP | 2006-169292 A | 6/2006 |
| JP | 2007-530737 A | 11/2007 |
| JP | 2008-533272 A | 8/2008 |
| JP | 2009-132700 A | 6/2009 |
| JP | 4547620 B2 | 9/2010 |
| JP | 2011-094128 A | 5/2011 |
| JP | 2012-121989 A | 6/2012 |
| JP | 2012-153747 A | 8/2012 |
| JP | 2012-531415 A | 12/2012 |
| JP | 2013-209617 A | 10/2013 |
| WO | 95/05184 A2 | 2/1995 |
| WO | 98/37149 A1 | 8/1998 |
| WO | 98/44933 A1 | 10/1998 |
| WO | 99/14275 A1 | 3/1999 |
| WO | 99/47587 A1 | 9/1999 |

(56) References Cited

FOREIGN PATENT DOCUMENTS

| | | | |
|---|---|---|---|
| WO | 00/22008 | A1 | 4/2000 |
| WO | 00/22017 | A1 | 4/2000 |
| WO | 00/59996 | A1 | 10/2000 |
| WO | 00/63259 | A1 | 10/2000 |
| WO | 01/18072 | A1 | 3/2001 |
| WO | 01/18073 | A1 | 3/2001 |
| WO | 02/22695 | A1 | 3/2002 |
| WO | 02/066543 | A1 | 8/2002 |
| WO | 02/085377 | A1 | 10/2002 |
| WO | 02/085378 | A1 | 10/2002 |
| WO | 02/085379 | A1 | 10/2002 |
| WO | 02/085380 | A1 | 10/2002 |
| WO | 02/085381 | A1 | 10/2002 |
| WO | 02/085382 | A1 | 10/2002 |
| WO | 02/085383 | A1 | 10/2002 |
| WO | 03/031501 | A1 | 4/2003 |
| WO | 2005/041900 | A2 | 5/2005 |
| WO | 2005/041902 | A2 | 5/2005 |
| WO | 2006/097942 | A1 | 9/2006 |
| WO | 2007/017286 | A1 | 2/2007 |
| WO | 2007/056405 | A2 | 5/2007 |
| WO | 2008/062437 | A2 | 5/2008 |
| WO | 2009/008480 | A1 | 1/2009 |
| WO | 2009/010531 | A1 | 1/2009 |
| WO | 2009/078956 | A1 | 6/2009 |
| WO | 2009/128085 | A1 | 10/2009 |
| WO | 2011/106542 | A2 | 9/2011 |
| WO | 2011/106545 | A1 | 9/2011 |
| WO | 2012/042542 | A1 | 4/2012 |
| WO | 2012/173031 | A1 | 12/2012 |
| WO | 2013/087238 | A1 | 6/2013 |
| WO | 2014/197725 | A1 | 12/2014 |
| WO | 2015/156251 | A1 | 10/2015 |
| WO | 2016/094685 | A1 | 6/2016 |
| WO | 2016/135065 | A1 | 9/2016 |
| WO | 2018/124264 | A1 | 7/2018 |

OTHER PUBLICATIONS

Office Action dated Oct. 16, 2020 from the US Patent Office in co-pending U.S. Appl. No. 16/457,338.
Extended European Search Report dated Oct. 26, 2020 from the European Patent Office in European Application No. 18869094.5.
International Search Report dated Apr. 3, 2018 from the International Searching Authority in counterpart International Application No. PCT/JP2017/047178.
International Preliminary Report on Patentability dated Jul. 2, 2019 from the International Bureau in counterpart International Application No. PCT/JP2017/047178.
Written Opinion dated Apr. 3, 2018 from the International Bureau in counterpart International Application No. PCT/JP2017/047178.
Extended European Search Reported dated Nov. 23, 2020 from the European Patent Office in European Application No. 18 86 8309.8.
Office Action dated Feb. 7, 2020 issued in subject matter related U.S. Appl. No. 16/456,822.
Fissell et al., "Phosphate Binder Pill Burden, Patient-Reported Non-Adherence, and Mineral Bone Disorder Markers: Findings from the DOPPS", Hemodial Int., Author manuscript, Jan. 2016, vol. 20, No. 1, pp. 38-49 (20 pages).
Inoue et al., "Highly Selective and Low-swelling Phosphate-binding Polymer for Hyperphosphatemia Therapy", Chem. Lett., 2012, vol. 41, pp. 932-933 (2 pages).
International Search Report and Written Opinion dated Nov. 27, 2018, issued by the International Searching Authority in application No. PCT/JP2018/038466, corresponding to related U.S. Appl. No. 16/457,338.
Zhang et al., "Facile preparation and evaluation of allylamine hydrochloride-based porous hydrogel without calcium and aluminum: an alternative candidate of phosphate binder", Polym. Bull., 2016, vol. 73, pp. 3371-3384 (16 pages).
Indian Bibliographical Data and Specification, dated Nov. 1, 2013, for Indian Application No. 1928/MUM2011.
International Preliminary Report on Patentability with translation of Written Opinion dated Apr. 21, 2020, issued by the International Bureau in application No. PCT/JP2018/038465, corresponds to related U.S. Appl. No. 16/456,822.
International Search Report and Written Opinion dated Nov. 27, 2018, issued by the International Searching Authority in application No. PCT/JP2018/038465, corresponds to related U.S. Appl. No. 16/456,822.
Office Action dated Aug. 4, 2020, from the Indian Patent Office in subject matter related Indian Application No. 202047016500.
Office Action dated Jul. 14, 2020, from the Japanese Patent Office in corresponding Japanese Application No. 2018-559628.
Office Action dated Aug. 7, 2020, from the U.S. Patent Office in co-pending U.S. Appl. No. 16/456,822.
Office Action dated Jul. 15, 2020, from the Indian Patent Office in corresponding Indian Application No. 201947025894.
Office Action dated Mar. 2, 2021, issued by the Australian Patent Office in subject-matter related Australian application No. 2018352766.
Office Action dated Dec. 10, 2020 from the United States Patent and Trademark Office in U.S. Appl. No. 16/456,822.
Office Action dated Apr. 20, 2021, from the Japanese Patent Office in subject matter related Japanese Application No. 2019-549288.
Office Action dated Apr. 20, 2021, from the Japanese Patent Office in subject matter related Japanese Application No. 2019-549289.
Office Action dated May 24, 2021, issued by the State Intellectual Property Office of the P.R.C. in Chinese application No. 201780080982.1.
Office Action dated May 21, 2021, issued by the Canadian Patent Office in Application No. 3,079,171 (Canadian patent application No. 3,079,171 corresponds to U.S. Appl. No. 17/139,370).
Hearing Notice dated Jul. 23, 2021 issued in subject-matter related Indian Patent Application No. 202047016500, corresponding to U.S. Appl. No. 17/139,370.
Decision of Refusal dated Sep. 7, 2021 from the Japanese Patent Office in Japanese Application No. 2019-549289, corresponding to U.S. Appl. No. 17/139,370.
Decision of Dismissal of Amendment dated Sep. 7, 2021 by the Japanese Patent Office in Japanese Application No. 2019-549289, corresponding to U.S. Appl. No. 17/139,370.

* cited by examiner

EMULSION OF NITROGEN ATOM-CONTAINING POLYMER OR SALT THEREOF, PRODUCTION METHOD THEREFOR, AND PRODUCTION METHOD FOR PARTICLES

CROSS-REFERENCE TO RELATED APPLICATIONS

This application is a Continuation of PCT International Application No. PCT/JP2017/047178 filed on Dec. 28, 2017, which claims priority under 35 U.S.C § 119(a) to Japanese Patent Application No. 2016-255554 filed on Dec. 28, 2016 and No. 2017-200011 filed on Oct. 16, 2017. Each of the above application(s) is hereby expressly incorporated by reference, in its entirety, into the present application.

BACKGROUND OF THE INVENTION

1. Field of the Invention

The present invention relates to an emulsion of a nitrogen atom-containing polymer or a salt thereof, and a production method therefor. More particularly, the invention relates to a method for producing an emulsion of a nitrogen atom-containing polymer or a salt thereof, the method including a step of mixing predetermined solutions and stirring the mixture, and to an emulsion comprising predetermined spherical objects and a predetermined dispersing medium. The invention also relates to a method for producing particles containing a crosslinked nitrogen atom-containing polymer or a salt thereof.

2. Description of the Related Art

Nitrogen atom-containing polymers are used in a variety of fields as highly functional materials. A nitrogen atom-containing polymer may be produced in the form of, for example, particles emulsified in a medium. Regarding a method for emulsifying nitrogen atom-containing polymer particles in a medium, a method of using emulsifiers is known. In JP1988-045721B (JP-563-045721B), a method for producing a small spherical crosslinked monoallylamine polymer is described, the method including emulsifying a water-based solution of a polymer of monoallylamine in a liquid medium, and crosslinking some of amino groups in the polymer with a predetermined compound while maintaining the emulsified state. In JP1988-045721B (JP-S63-045721B), it is described that a nonionic or cationic surfactant or an alkyl ether of cellulose can be used in order to emulsify an aqueous solution of polyallylamine in a liquid medium.

In JP1992-008710A (JP-H04-008710A), it is described that particles are obtained from polymerization of a predetermined monomer mixture by using an organic solvent that dissolves the monomers but does not dissolve a polymer of the monomers as a solvent in the presence of a polymer dispersant, and amino group-containing polymer particles are produced by reacting the thus obtained particles with a compound having a nitrogen atom to which at least one hydrogen atom is bonded.

In JP1986-051006A (JP-S61-051006A), a method for producing crosslinked spheres of a polyvinylamine is described, the method including performing the production of crosslinked spheres by suspending an aqueous solution of a polyvinylamine in the presence of a water-insoluble dispersing medium, and reacting the suspension with a polyfunctional crosslinking agent.

SUMMARY OF THE INVENTION

In the Examples of JP1988-045721B (JP-S63-045721B), it is described that an aqueous solution of polyallylamine is added to a mixed liquid of chlorobenzene and o-dichlorobenzene including sorbitan sesquioleate as an emulsifier, and a polymer having a particle diameter of 20 to 500 µm is obtained. In JP1988-045721B (JP-S63-045721B), sorbitan sesquioleate is used as an emulsifier; however, with sorbitan sesquioleate, polyallylamine particles are not easily emulsified.

It is an object of the present invention to provide a method for producing an emulsion of a nitrogen atom-containing polymer or a salt thereof, the emulsion having high emulsion stability and having a low dispersity of the particle diameter (particle size) of emulsified particles, and to provide an emulsion of a nitrogen atom-containing polymer or a salt thereof, the emulsion having a low dispersity of the particle diameter of emulsified particles. It is another object of the present invention to provide a method for producing particles containing a crosslinked nitrogen atom-containing polymer or a salt thereof, using the above-described emulsion.

The inventors of the present invention conducted a thorough investigation in order to solve the problems described above, and as a result, the inventors found that an emulsion of a nitrogen atom-containing polymer or a salt thereof, the emulsion having a low dispersity of the particle diameter of emulsified particles, can be produced by mixing a first solution including a nitrogen atom-containing polymer or a salt thereof and a hydrophilic solvent and having a viscosity of 10 to 2,000 mPa·s, and a second solution including a hydrophobic solvent and having a viscosity of 1 to 100 mPa·s such that the ratio between the viscosity of the first solution and the viscosity of the second solution is in the range of 0.1:1 to 300:1, and stirring the mixture. Furthermore, the inventors of the present invention found that by subjecting an emulsion produced as described above to a crosslinking reaction, particles containing a crosslinked nitrogen atom-containing polymer or a salt thereof can be produced. The present invention was completed based on these findings.

That is, according to the present invention, the following inventions are provided.

[1] A method for producing an emulsion of a nitrogen atom-containing polymer or a salt thereof, the method comprising:

a step of mixing a first solution including a nitrogen atom-containing polymer or a salt thereof and a hydrophilic solvent and having a viscosity of 10 to 2,000 mPa·s, and a second solution including a hydrophobic solvent and having a viscosity of 1 to 100 mPa·s, stirring the mixture, and thus obtaining an emulsion of the nitrogen atom-containing polymer or a salt thereof, wherein the ratio between the viscosity of the first solution and the viscosity of the second solution is in the range of 0.1:1 to 300:1.

[2] The method according to [1], wherein the viscosity of the first solution is 10 to 1,500 mPa·s.

[3] The method according to [1] or [2], wherein the ratio between the viscosity of the first solution and the viscosity of the second solution is in the range of 0.2:1 to 100:1.

[4] The method according to any one of [1] to [3], wherein the amine value of the nitrogen atom-containing polymer or a salt thereof is 10 mmol/g or more.

[5] The method according to any one of [1] to [4], wherein the nitrogen atom-containing polymer is at least one selected from the group consisting of polyallylamine, a polyalkyleneimine, and polyvinylamine.

[6] The method according to any one of [1] to [4], wherein the nitrogen atom-containing polymer includes polyallylamine.

[7] The method according to any one of [1] to [6], wherein the second solution includes an emulsifier having a weight-average molecular weight or number-average molecular weight of 2,000 or more.

[8] The method according to [7], wherein the emulsifier includes a sugar.

[9] The method according to [7] or [8], wherein the emulsifier includes a cellulose ether.

[10] The method according to any one of [1] to [9], wherein the hydrophobic solvent is at least one selected from the group consisting of an aromatic hydrocarbon-based solvent, an ester-based solvent, and olive oil.

[11] The method according to any one of [1] to [10], wherein the emulsion of the nitrogen atom-containing polymer or a salt thereof has an average particle diameter of emulsified particles of 1 to 200 μm.

[12] An emulsion comprising:
spherical objects formed from a first solution that includes a nitrogen atom-containing polymer or a salt thereof and a hydrophilic solvent and has a viscosity of 10 to 2,000 mPa·s; and
a dispersing medium including a second solution that includes a hydrophobic solvent and has a viscosity of 1 to 100 mPa·s,
wherein the ratio between the viscosity of the first solution and the viscosity of the second solution is in the range of 0.1:1 to 300:1.

[13] A method for producing particles containing a crosslinked nitrogen atom-containing polymer or a salt thereof, the method comprising:
a step of mixing a first solution including a nitrogen atom-containing polymer or a salt thereof and a hydrophilic solvent and having a viscosity of 10 to 2,000 mPa·s, and a second solution including a hydrophobic solvent and having a viscosity of 1 to 100 mPa·s, stirring the mixture, and obtaining an emulsion of the nitrogen atom-containing polymer or a salt thereof; and
a step of adding a crosslinking agent to the emulsion obtained by emulsifying the nitrogen atom-containing polymer or a salt thereof, and performing a crosslinking reaction,
wherein the ratio between the viscosity of the first solution and the viscosity of the second solution is in the range of 0.1:1 to 300:1.

[14] The method for producing particles according to [13], wherein the nitrogen atom-containing polymer is a crosslinked polymer having a substituent containing an $NR^{41}R^{42}$ structure:
in Formula, $R^{41}$ and $R^{42}$ each independently represent a hydrogen atom, an alkyl group having 1 to 20 carbon atoms, an aminoalkyl group having 1 to 20 carbon atoms or a salt thereof, an alkylaminoalkyl group having 2 to 20 carbon atoms or a salt thereof, a dialkylaminoalkyl group having 3 to 20 carbon atoms or a salt thereof, a trialkylammoniumalkyl group having 4 to 20 carbon atoms, an alkylcarbonyl group having 1 to 20 carbon atoms, a carboxyalkyl group having 1 to 20 carbon atoms, or a hydroxyalkyl group having 1 to 20 carbon atoms.

[15] The method for producing particles according to [13] or [14], wherein the particles have an average particle diameter of 20 to 150 μm and a swelling rate of 9 to 16 ml/g, provided that the average particle diameter is determined by converting the areas of 1,000 or more particle images of optical microscopic photographs into diameters, and calculating the average particle diameter as the volume average particle diameter using those diameters, and the swelling rate is determined by swelling particles by repeating shaking and standing for one hour or longer in an aqueous solution at pH 6.3 of 2.2% by mass of sodium 2-morpholinoethanesulfonate and 0.5% by mass of sodium chloride at 20° C. twenty or more times, and calculating the swelling rate by dividing the particle volume after swelling by the particle mass before swelling.

[16] The method for producing particles according to any one of [13] to [15], wherein each of the particles has an outer shell portion and a central portion having a lower degree of crosslinking than the outer shell portion.

According to the present invention, an emulsion of a nitrogen atom-containing polymer or a salt thereof, the emulsion having high emulsion stability and having a low dispersity of the particle diameter of emulsified particles, can be produced. According to the present invention, particles containing a crosslinked nitrogen atom-containing polymer or a salt thereof can be produced by using the emulsion described above.

DESCRIPTION OF THE PREFERRED EMBODIMENTS

In the following description, embodiments of the present invention will be described in detail.

According to the present invention, unless particularly stated otherwise, the percentage (%) is percent (%) by mass.

According to the present invention, unless particularly stated otherwise, the various terms have the following meanings.

According to the present invention, unless particularly stated otherwise, a value range expressed using the symbol "~" means a range including the values described before and after the symbol "~" as the minimum value and the maximum value, respectively.

A halogen means fluorine, chlorine, bromine, or iodine.

An alkyl group having 1 to 20 carbon atoms ($C_{1-20}$ alkyl group) means a linear or branched $C_{1-20}$ alkyl group, such as a methyl, ethyl, propyl, isopropyl, butyl, sec-butyl, isobutyl, tert-butyl, pentyl, isopentyl 2-methylbutyl, 2-pentyl, 3-pentyl, or hexyl group. A preferred carbon number of the alkyl group is 1 to 10, more preferably 1 to 6, and even more preferably 1 to 3.

An alkylene group means a linear or branched alkylene group, such as a methylene, ethylene, propylene, butylene, or hexylene group. A preferred carbon number of the alkylene group is 1 to 19, more preferably 1 to 10, and even more preferably 1 to 6.

An alkylamino group having 1 to 20 carbon atoms ($C_{1-20}$ alkylamino group) means a linear or branched $C_{1-20}$ alkylamino group, such as a methylamino, ethylamino, propylamino, isopropylamino, cyclopropylamino, butylamino, sec-butylamino, tert-butylamino, cyclobutylamino, pentylamino, cyclopentylamino, hexylamino, or cyclohexylamino group. A preferred carbon number is 1 to 10, more preferably 1 to 6, and even more preferably 1 to 3.

A dialkylamino group having 2 to 20 carbon atoms (di($C_{1-20}$ alkyl)amino group) means a linear or branched di($C_{1-20}$ alkyl)amino group, such as a dimethylamino, diethylamino, dipropylamino, diisopropylamino, dibutylamino, di(tert-butyl)amino, dipentylamino, dihexylamino, (ethyl)(methyl) amino, (methyl)(propyl)amino, (cyclopropyl)(methyl) amino, (cyclobutyl)(methyl) amino, or (cyclohexyl)(methyl)amino group. A preferred carbon number is 2 to 10, and more preferably 2 to 6. Those alkyl groups may be identical or different.

An aminoalkyl group having 1 to 20 carbon atoms is a group in which at least one hydrogen atom of the above-mentioned alkyl group having 1 to 20 carbon atoms has been substituted by an amino group, and it is preferable that a hydrogen atom on the carbon atom at an end of the alkyl group has been substituted by an amino group. A preferred carbon number is 1 to 10, more preferably 1 to 6, and even more preferably 1 to 3.

An alkylaminoalkyl group having 2 to 20 carbon atoms is a group in which a hydrogen atom of an amino group in an aminoalkyl group has been substituted by an alkyl, and the sum of the numbers of carbon atoms of the two alkyls is in the range of 2 to 20. A preferred carbon number is 2 to 10, and more preferably 2 to 6.

A dialkylaminoalkyl group having 3 to 20 carbon atoms is a group in which two hydrogen atoms of an amino group in an aminoalkyl group have been respectively substituted by an alkyl, and the sum total of the numbers of carbon atoms of the three alkyls is in the range of 3 to 20. A preferred carbon number is 3 to 10, and more preferably 3 to 6. Those alkyls may be identical or different.

A salt of an aminoalkyl group having 1 to 20 carbon atoms, a salt of an alkylaminoalkyl group having 2 to 20 carbon atoms, and a salt of a dialkylaminoalkyl group having 3 to 20 carbon atoms mean the case in which a nitrogen atom in an aminoalkyl group, an alkylaminoalkyl group, or a dialkylaminoalkyl group has formed an ammonium salt. An ammonium salt may be a salt with an organic acid or an inorganic acid, and examples of the organic acid include formic acid, acetate, oxalic acid, succinic acid, and citric acid, while examples of the inorganic acid include hydrochloric acid, carbonic acid, sulfuric acid, nitric acid, and phosphoric acid.

A trialkylammoniumalkyl group having 4 to 20 carbon atoms is a group in which at least one hydrogen atom of the above-mentioned alkyl group having 1 to 16 carbon atoms (a preferred carbon number is 1 to 10, and more preferably 1 to 6) has been substituted by a trialkylammonium group, and it is preferable that a hydrogen atom on the carbon atom at an end of the alkyl group has been substituted. The alkyl group of the trialkylammonium group is an alkyl group having 1 to 8 carbon atoms (a preferred carbon number is 1 to 6, and more preferably 1 to 3). These alkyls may be identical or different.

The alkylcarbonyl group having 1 to 20 carbon atoms is a carbonyl group substituted with an alkyl group having 1 to 20 carbon atoms. A preferred carbon number is 1 to 10, and more preferably 1 to 6. Specific examples include acetyl, propionyl, butyryl, isobutyryl, and pivaloyl groups.

A carboxyalkyl group having 1 to 20 carbon atoms is specifically —$(CH_2)_n$—COOH, wherein n represents an integer from 1 to 20. n is preferably 1 to 10, and more preferably 1 to 6.

A hydroxyalkyl group having 1 to 20 carbon atoms is specifically —$(CH_2)_n$—OH, wherein n represents an integer from 1 to 20. n is preferably 1 to 10, and more preferably 1 to 6.

An alkoxy group having 1 to 20 carbon atoms ($C_{1-20}$ alkoxy group) means a linear, cyclic, or branched $C_{1-20}$ alkyloxy group, such as a methoxy, ethoxy, propoxy, isopropoxy, a cyclopropoxy, butoxy, isobutoxy, sec-butoxy, tert-butoxy, cyclobutoxy, pentyloxy, or hexyloxy group. A preferred carbon number of an alkoxy group is 1 to 10, and more preferably 1 to 6.

The weight-average molecular weight or the number-average molecular weight of a hydrophilic polymer (for example, an amine-containing polymer or a salt thereof) according to the present invention is a value determined by gel permeation chromatography (GPC) measurement based on conversion relative to polyethylene oxide standards. More specifically, the measurement of the weight-average molecular weight or the number-average molecular weight is carried out using GPC under the following conditions.

Apparatus: HLC-8320GPC manufactured by Tosoh Corporation

Column: TSK-GEL G5000PWXL manufactured by Tosoh Corporation

Column temperature: 40° C.

Flow rate: 1.0 mL/min

Calibration curve: TOSOH TSKstandard POLY(ETHYLENE OXIDE)

Eluent: A solution obtained by diluting 42.5 g of sodium nitrate in 5,000 g of a mixture of water/acetonitrile (9/1).

The weight-average molecular weight or the number-average molecular weight of a hydrophobic polymer according to the present invention is a value determined by GPC measurement based on conversion relative to polystyrene standards. More specifically, the measurement of the weight-average molecular weight or the number-average molecular weight is carried out using GPC under the following conditions.

Apparatus: HLC-8220GPC manufactured by Tosoh Corporation

Column: TSK-GEL GMHHR-N manufactured by Tosoh Corporation

Column temperature: 40° C.

Flow rate: 1.0 mL/min

Calibration curve: TOSOH TSKstandard POLYSTYRENE

Eluent: Tetrahydrofuran

In the method for producing an emulsion of a nitrogen atom-containing polymer or a salt thereof (preferably, an amino group-containing polymer or a salt thereof) of the embodiment of the present invention, an emulsion of a nitrogen atom-containing polymer or a salt thereof (preferably, an amino group-containing polymer or a salt thereof) is obtained by mixing a first solution including a nitrogen atom-containing polymer or a salt thereof (preferably, an amino group-containing polymer or a salt thereof) and a hydrophilic solvent and having a viscosity of 10 to 2,000 mPa·s, and a second solution including a hydrophobic solvent and having a viscosity of 1 to 100 mPa·s, and stirring the mixture. Here, the ratio between the viscosity of the first solution and the viscosity of the second solution is in the range of 0.1:1 to 300:1.

With sorbitan sesquioleate that is used as an emulsifier in the Examples of JP1988-045721B (JP-S63-045721B), polyallylamine particles are not easily emulsified. Therefore, an emulsification operation involving high-speed rotation at a rate of 600 rotations/minute is needed. JP1992-008710A (JP-H04-008710A) discloses a predetermined monomer mixture is polymerized in the presence of a polymer dispersant. JP1986-051006A (JP-S61-051006A) discloses that the production of crosslinked spheres is carried out by reacting a polyvinylamine with a polyfunctional crosslinking agent. As described above, in JP1988-045721B (JP-S63-045721B), JP1992-008710A (JP-H04-008710A), and JP1986-051006A (JP-S61-051006A), there is no description that an emulsion of a nitrogen atom-containing polymer or a salt thereof, the emulsion having a low dispersity of the particle diameter of emulsified particles, can be produced by a configuration in which the viscosity of the first solution is 10 to 2,000 mPa·s, the viscosity of the second solution is 1 to 100 mPa·s, and the ratio between the viscosity of the first solution and the viscosity of the second solution is in the range of 0.1:1 to 300:1. More specifically, in JP1988-045721B (JP-S63-045721B), since sorbitan sesquioleate is used in the second solution, the viscosity of the second solution is less than 1 mPa·s, and the ratio of viscosities will not be in the range according to the present invention. In this present invention, there was found a remarkable effect that an emulsion of a nitrogen atom-containing polymer or a salt thereof, the emulsion having a low dispersity of the particle diameter of emulsified particles, can be produced by employing a configuration in which the viscosity of the first solution is 10 to 2,000 mPa·s, the viscosity of the second solution is 1 to 100 mPa·s, and the ratio between the viscosity of the first solution and the viscosity of the second solution is in the range of 0.1:1 to 300:1.

An emulsion produced by the method for producing an emulsion of a nitrogen atom-containing polymer or a salt thereof of the embodiment of the present invention has a low dispersity of the particle diameter of emulsified particles and achieves a uniform emulsified state. Such an emulsion of a nitrogen atom-containing polymer or a salt thereof, the emulsion having a low dispersity of the particle diameter of emulsified particles, can be utilized in a modification reaction for a nitrogen atom-containing polymer, or the like. Since the emulsion of the embodiment of the present invention has a low dispersity of the particle diameter of emulsified particles, the emulsion has an advantage that the reaction ratio of the modification reaction is increased. The use application of a nitrogen atom-containing polymer modified by the above-described reaction is not particularly limited; however, for example, the polymer can be utilized for use applications such as an ink composition (see JP5575594B and the like).

As to First Solution

In the present invention, a first solution including a nitrogen atom-containing polymer or a salt thereof and a hydrophilic solvent is used.

The nitrogen atom-containing polymer may contain a nitrogen atom in the main chain, or may contain a nitrogen atom in a side chain.

The type of the nitrogen atom-containing polymer or a salt thereof is not particularly limited. The amine value of the nitrogen atom-containing polymer or a salt thereof is preferably 10 mmol/g or more, more preferably 12 mmol/g or more, even more preferably 15 mmol/g or more, and particularly preferably 17 mmol/g or more. The upper limit of the amine value of the nitrogen atom-containing polymer or a salt thereof is not particularly limited; however, generally, the upper limit is 50 mmol/g or less.

The amine value of polyallylamine or a salt thereof is preferably 10 mmol/g or more, and more preferably 15 mmol/g or more. The amine value of a polyalkyleneimine or a salt thereof, and the amine value of polyvinylamine or a salt thereof are preferably 20 mmol/g or more.

The amine value of a nitrogen atom-containing polymer or a salt thereof represents an amine value per gram of the solid content, and the amine value refers to a value determined according to a potentiometric titration method using a 0.1 mol/L aqueous solution of hydrochloric acid and then converted in terms of the equivalent of potassium hydroxide.

A preferred specific example of the nitrogen atom-containing polymer may be at least one selected from the group consisting of polyallylamine, a polyalkyleneimine, and polyvinylamine. The nitrogen atom-containing polymer is preferably an amino group-containing polymer, and polyallylamine is particularly preferred.

Polyallylamine means a polymer containing an allylamine structure as a repeating unit, and the allyl moiety and the amine moiety in the allylamine structure may be respectively substituted.

Polyalkyleneimine means a polymer containing an alkyleneimine structure as a repeating unit, and the alkylene moiety and the amine moiety in the alkyleneimine structure may be respectively substituted.

Polyvinylamine means a polymer containing a vinylamine structure as a repeating unit, and the vinyl moiety and the amine moiety in the vinylamine structure may be respectively substituted.

The polyallylamine, polyalkyleneimine, and polyvinylamine described above may be substituted compounds as described above, and the substituent is preferably an organic group. Specific examples of the substituent include a halogen atom, an alkyl group having 1 to 20 carbon atoms, an aminoalkyl group having 1 to 20 carbon atoms or a salt thereof, an alkylaminoalkyl group having 2 to 20 carbon atoms or a salt thereof, a dialkylaminoalkyl group having 3 to 20 carbon atoms or a salt thereof, a trialkylammoniumalkyl group having 4 to 20 carbon atoms, an alkylcarbonyl group having 1 to 20 carbon atoms, a carboxyalkyl group having 1 to 20 carbon atoms [specifically, —$(CH_2)_n$—COOH, wherein n represents an integer from 1 to 19], and a hydroxyalkyl group having 1 to 20 carbon atoms. These organic groups can be introduced by reacting one of the polymers with a low-molecular weight compound such as a carboxylic acid chloride, an acid anhydride, or lactone. One kind of substituent may be used, or two or more kinds of substituents may also be used.

Examples of the salt of the nitrogen atom-containing polymer include a halogenide salt (for example, hydrochloride), a phosphate, a phosphite, a carbonate, a bicarbonate, a sulfate, a hydrogensulfate, a hydroxide, a nitrate, a persulfate, a sulfite, an acetate, an ascorbate, a citrate, an oxalate, a succinate, a tartrate, a taurocholate, and a cholate. Among these, a hydrochloride or a carbonate is preferred.

Regarding the salt of the nitrogen atom-containing polymer, it is preferable that more than 0% and 50% or less of all amino groups in the polymer have been neutralized.

Regarding the nitrogen atom-containing polymer or a salt thereof, a non-salt compound is preferable.

The polyalkyleneimine is preferably a poly(alkyleneimine) having an alkylene group having 1 to 6 carbon atoms (hereinafter, also referred to as poly(lower alkyleneimine)), and the polyalkyleneimine may be chain-like or may have a network-like structure.

The poly(lower alkyleneimine) is preferably a polymer compound including a repeating unit represented by the following General Formula (I-1) or General Formula (I-2).

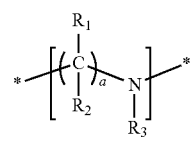

(I-1)

-continued

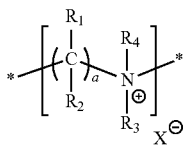
(I-2)

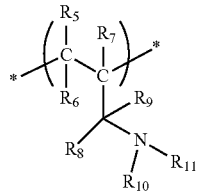
(II-1)

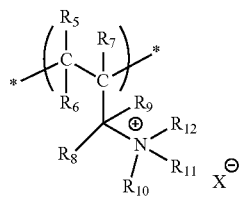
(II-2)

In General Formulae (I-1) and (I-2), $R_1$ and $R_2$ each independently represent a hydrogen atom, a halogen atom, or an alkyl group having 1 to 20 carbon atoms (preferably, an alkyl group having 1 to 6 carbon atoms).

$R_3$ and $R_4$ each independently represent a hydrogen atom, an alkyl group having 1 to 20 carbon atoms, an aminoalkyl group having 1 to 20 carbon atoms or a salt thereof, an alkylaminoalkyl group having 2 to 20 carbon atoms or a salt thereof, a dialkylaminoalkyl group having 3 to 20 carbon atoms or a salt thereof, a trialkylammoniumalkyl group having 4 to 20 carbon atoms, an alkylcarbonyl group having 1 to 20 carbon atoms, a carboxyalkyl group having 1 to 20 carbon atoms [specifically, —$(CH_2)_n$—COOH, wherein n represents an integer from 1 to 19], or a hydroxyalkyl group having 1 to 20 carbon atoms.

$X^-$ represents a negatively charged counterion, and $X^-$ is preferably $F^-$, $Cl^-$, $Br^-$, $I^-$, $PO_4^{3-}$, $PO_3^{3-}$, $CO_3^{2-}$, $HCO_3^-$, $SO_4^{2-}$, $HSO_4^-$, $OH^-$, $NO_3^-$, $S_2O_8^{2-}$, $SO_3^{2-}$, $CH_3CO_2^-$, or the like. $X^-$ is more preferably $Cl^-$, $CO_3^{2-}$, or $HCO_3^-$, and particularly preferably $Cl^-$, $CO_3^{2-}$, or $HCO_3^-$. A salt of this is preferably a halogenide salt, a phosphate, a phosphite, a carbonate, a bicarbonate, a sulfate, a hydrogensulfate, a hydroxide, a nitrate, a persulfate, a sulfite, an acetate, an ascorbate, a citrate, an oxalate, a succinate, a tartrate, a taurocholate, or a cholate.

a represents an integer from 1 to 6.

The symbol * represents a linking portion between repeating units.

A polymer compound having a repeating unit represented by General Formula (I-1) or General Formula (I-2) may include both a repeating unit represented by General Formula (I-1) and a repeating unit represented by General Formula (I-2).

In General Formula (I-1) and General Formula (I-2), it is preferable, from the viewpoint of the availability of raw materials, that $R_1$ and $R_2$ are hydrogen atoms.

A polymer compound including a repeating unit represented by General Formula (I-1) may further include another repeating unit as a copolymerization component. In addition to the repeating units represented by General Formula (I-1) and General Formula (I-2), and examples of such a repeating unit include a lower alkyleneimine repeating unit containing a primary, secondary, or tertiary amino group. The nitrogen atom in the lower alkyleneimine repeating unit may further have a substituent having the same meaning as $R_1$ bonded thereto.

Specific examples of the poly(lower alkyleneimine) include polyethyleneimine and polypropyleneimine. Furthermore, regarding the poly(lower alkyleneimine), a commercially available product can also be used, and examples include SP-003, SP-006, SP-012, SP-018, SP-200, and P-1000 (all manufactured by Nippon Shokubai Co., Ltd.).

The polyallylamine is preferably a polymer compound having a repeating unit represented by the following General Formula (II-1) or the following General Formula (II-2).

In General Formula (II-1) and General Formula (II-2), $R_5$, $R_6$, $R_7$, $R_8$, and $R_9$ each independently represent a hydrogen atom, a halogen atom, or an alkyl group having 1 to 20 carbon atoms (preferably, an alkyl group having 1 to 6 carbon atoms).

$R_{10}$, $R_{11}$, and $R_{12}$ each independently represent a hydrogen atom, an alkyl group having 1 to 20 carbon atoms, an aminoalkyl group having 1 to 20 carbon atoms or a salt thereof, an alkylaminoalkyl group having 2 to 20 carbon atoms or a salt thereof, a dialkylaminoalkyl group having 3 to 20 carbon atoms, a trialkylammoniumalkyl group having 4 to 20 carbon atoms, an alkylcarbonyl group having 1 to 20 carbon atoms, a carboxyalkyl group having 1 to 20 carbon atoms [specifically, —$(CH_2)_n$—COOH, wherein in Formula, n represents an integer from 1 to 19], or a hydroxyalkyl group having 1 to 20 carbon atoms.

The symbol * and X have the same meanings as the symbol * and X in General Formula (I-2), respectively.

A polymer compound having a repeating unit represented by General Formula (II-1) or General Formula (II-2) may include both a repeating unit represented by General Formula (II-1) and a repeating unit represented by General Formula (II-2).

In General Formulae (II-1) and (II-2), it is preferable, from the viewpoint of the availability of raw materials, that $R_5$, $R_6$, $R_7$, $R_8$, and $R_9$ are hydrogen atoms.

A polymer compound having a repeating unit represented by General Formula (II-1) or General formula (II-2) may further include another repeating unit as a copolymerization component, in addition to the repeating units represented by General Formula (II-1) and General Formula (II-2).

Regarding the polyallylamine, a commercially available product can also be used. Examples include PAA-01, PAA-03, PAA-05, PAA-08, PAA-15, PAA-15C, PAA-25, PAA-H-10C, PAA-1112, and PAA-U5000 (all manufactured by Nittobo Medical Co., Ltd.).

Regarding the polyvinylamine, a polymer compound having a repeating unit represented by the following General Formula (III-1) or the following General Formula (III-2) is preferable.

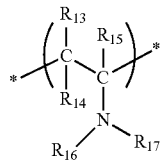
(III-1)

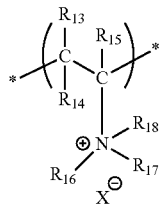

(III-2)

In General Formula (III-1) and General Formula (III-2), $R_{13}$, $R_{14}$, and $R_{15}$ each independently represent a hydrogen atom, a halogen atom, or an alkyl group (preferably, an alkyl group having 1 to 6 carbon atoms).

$R_{16}$, $R_{17}$, and $R_{18}$ each independently represent a hydrogen atom, an alkyl group having 1 to 20 carbon atoms, an aminoalkyl group having 1 to 20 carbon atoms or a salt thereof, an alkylaminoalkyl group having 2 to 20 carbon atoms or a salt thereof, a dialkylaminoalkyl group having 3 to 20 carbon atoms or a salt thereof, a trialkylammoniumalkyl group having 4 to 20 carbon atoms, an alkylcarbonyl group having 1 to 20 carbon atoms, a carboxyalkyl group having 1 to 20 carbon atoms [specifically, —$(CH_2)_n$—COOH, wherein in Formula, n represents an integer from 1 to 19], or a hydroxyalkyl group having 1 to 20 carbon atoms.

The symbol * and X have the same meanings as the symbol * and X in General Formula (I-1) and General Formula (I-2), respectively.

A polymer compound having a repeating unit represented by General Formula (III-1) or General Formula (III-2) may include both a repeating unit represented by General Formula (III-1) and a repeating unit represented by General Formula (III-2).

In General Formulae (III-1) and (III-2), it is preferable that $R_{13}$, $R_{14}$, and $R_{15}$ are hydrogen atoms, from the viewpoint of the availability of raw materials.

A polymer compound having a repeating unit represented by General Formula (III-1) or General Formula (III-2) may further include another repeating unit as a copolymerization component, in addition to the repeating units represented by General Formula (III-1) and General Formula (III-2).

Generally, a polyvinylamine can be synthesized by a method of hydrolyzing the entirety or a portion of a polymer or a copolymer of N-vinylcarboxylic acid amide in the presence of an acid or an alkali, as described in JP1990-222404A (JP-H02-222404A), or a method of performing polymerization of an aqueous monomer solution using an azo-based initiator in an organic solvent or a water-based solvent, as described in JP1994-122712A (JP-H06-122712A).

Regarding the polyvinylamine, a commercially available product can be used. For example, PVAM-0595B (manufactured by Mitsubishi Rayon Co., Ltd.) may be used.

The lower limit of the weight-average molecular weight of the nitrogen atom-containing polymer or a salt thereof is not particularly limited; however, the lower limit is generally 1,000 or more, preferably 2,000 or more, and more preferably 3,000 or more, may be 5,000 or more, may be 10,000 or more, or may be 15,000 or more. The upper limit of the weight-average molecular weight of the nitrogen atom-containing polymer or a salt thereof is not particularly limited; however, the upper limit is generally 1,000,000 or less, preferably 500,000 or less, and more preferably 100,000 or less.

The hydrophilic solvent is not particularly limited as long as it is a solvent capable of dissolving the nitrogen atom-containing polymer or a salt thereof, and any of water, an organic solvent, or a mixture of water and an organic solvent may be used. As the organic solvent, a lower alcohol (for example, methanol, ethanol, n-propanol, or isopropanol), acetone, acetonitrile, or the like can be used. The hydrophilic solvent is preferably water.

The viscosity of the first solution is 10 to 2,000 mPa·s, preferably 10 to 1,500 mPa·s, and more preferably 15 to 1,000 mPa·s.

Regarding the measurement of the viscosity of the first solution, the measurement is carried out at 25° C. Regarding the measurement of viscosity, measurement can be made according to a known technique. For example, measurement can be carried out using an R215 type viscometer (RE-215L) manufactured by Toki Sangyo Co., Ltd. In a case in which the viscosity is higher than 100 mPa·s, the viscosity is measured with a sample amount of 0.6 ml using a cone rotor for high viscosity (3°×R9.7). In a case in which the viscosity is lower than 100 mPa·s, the viscosity is measured with a sample amount of 0.2 ml using a con rotor for low viscosity (0.8°×R24). The speed of rotation is set such that the torque index value (TQ) will be stabilized in the range of 50% to 100%, and the viscosity is read out.

The content of the nitrogen atom-containing polymer of a salt thereof in the first solution is not particularly limited. The content is generally 1% to 80% by mass, preferably 2% to 70% by mass, more preferably 5% to 60% by mass, and particularly preferably 10% to 50% by mass.

The upper limit of the content of the nitrogen atom-containing polymer or a salt thereof in the first solution is 80% by mass, preferably 60% by mass, more preferably 50% by mass, and particularly preferably 40% by mass. The lower limit of the content is 1% by mass, preferably 5% by mass, more preferably 10% by mass, and particularly preferably 15% by mass. A more suitable range of the content is 1% to 80% by mass, preferably 5% to 60% by mass, more preferably 10% to 50% by mass, and particularly preferably 15% to 40% by mass.

Second Solution

In the present invention, a second solution including a hydrophobic solvent and having a viscosity of 1 to 100 mPa·s is used. The hydrophobic solvent is not particularly limited; however, examples include an aromatic hydrocarbon-based solvent (for example, benzene, toluene, xylene, mesitylene, ethylebenzene, diethylbenzene, propylbenzene, chlorobenzene, o-dichlorobenzene, or t-butylbenzene), an ester-based solvent (for example, ethyl acetate, butyl acetate, or propylene glycol monomethyl ether acetate), a ketone-based solvent (for example, cyclohexanone), a halogen-based solvent (for example, methylene chloride, chloroform, bromoform, or carbon tetrachloride), a saturated hydrocarbon-based solvent (for example, liquid paraffin, hexane, heptane, or cyclohexane), mineral oil, and olive oil. These may be used singly, or two or more kinds thereof may be used as mixtures. The hydrophobic solvent is preferably an aromatic hydrocarbon-based solvent, an ester-based solvent, or olive oil; more preferably an aromatic hydrocarbon-based solvent; and particularly preferably toluene or xylene.

The second solution may include a solvent other than a hydrophobic solvent, in addition to the hydrophobic solvent. Regarding the solvent other than a hydrophobic solvent, a hydrophilic solvent such as an alcohol (for example, methanol, ethanol, 2-propanol, hexanol, ethylene glycol monopropyl ether, or polyethylene glycol), an ether (bis[2-methoxyethoxyethyl], dibutyl ether, or the like), tetrahydrofuran, or acetonitrile may also be used. The hydrophilic solvent is preferably an alcohol or an ether; more preferably an alcohol; and most preferably ethanol.

In a case in which the second solution includes a solvent other than a hydrophobic solvent, the content of the solvent other than a hydrophobic solvent is, by mass ratio, 50% or less, preferably 30% or less, more preferably 20% or less, and even more preferably 15% or less, with respect to the content of the hydrophobic solvent. The lower limit of the content is 0.1%.

The viscosity of the second solution is 1 to 100 mPa·s. By adjusting the viscosity of the second solution to be in the above-described range, an emulsion of a nitrogen atom-containing polymer or a salt thereof, the emulsion having a low dispersity of the particle diameter of emulsified particles, can be produced. The viscosity of the second solution is preferably 2 to 60 mPa·s, and more preferably 3 to 30 mPa·s.

In a case in which the second solution includes a hydrophilic solvent, the viscosity of the second solution is preferably 1 to 50 mPa·s, more preferably 1 to 30 mPa·s, and even more preferably 1 to 20 mPa·s.

The measurement of the viscosity of the second solution can be carried out by a method similar to that used for the measurement of the viscosity of the first solution.

The ratio between the viscosity of the first solution and the viscosity of the second solution is in the range of 0.1:1 to 300:1, preferably in the range of 0.2:1 to 100:1, more preferably in the range of 0.5:1 to 50:1, and particularly preferably in the range of 0.9:1 to 30:1.

In a case in which the hydrophobic solvent itself that is used in the second solution has a viscosity of 1 to 100 mPa·s, the second solution may be composed of the hydrophobic solvent only; however, the second solution may include an emulsifier for achieving the viscosity of 1 to 100 mPa·s.

Regarding the emulsifier, it is preferable to use an emulsifier having a weight-average molecular weight or a number-average molecular weight of 2,000 or more. By using a polymeric emulsifier having a weight-average molecular weight or a number-average molecular weight of 2,000 or more, satisfactory emulsifiability can be achieved. The weight-average molecular weight or number-average molecular weight is more preferably 10,000 or more, even more preferably 50,000 or more, and particularly preferably 100,000 or more. The upper limit of the weight-average molecular weight or number-average molecular weight of the emulsifier is not particularly limited; however, the upper limit is generally 1,000,000 or less. As the emulsifier, a hydrophobic polymer is preferable.

Specific examples of the emulsifier include the following compounds, and these can be used singly or in combination of two or more kinds thereof.

A polystyrene derivative such as polystyrene, polyhydroxystyrene, polystyrenesulfonic acid, a vinylphenol-(meth)acrylic acid ester copolymer, a styrene-(meth)acrylic acid ester copolymer, or a styrene-vinylphenol-(meth) acrylic acid ester copolymer;

a poly(meth)acrylic acid derivative such as a poly(meth) acrylic acid ester copolymer, polymethyl (meth)acrylate, poly(meth)acrylamide, polyacrylonitrile, polyethyl (meth) acrylate, or polybutyl (meth)acrylate;

a polyvinyl alkyl ether derivative such as polymethyl vinyl ether, polyethyl vinyl ether, polybutyl vinyl ether, or polyisobutyl vinyl ether;

a polyalkylene glycol derivative such as polypropylene glycol;

a cellulose derivative (sugar) such as cellulose, ethyl cellulose, cellulose propionate, cellulose acetate propionate, cellulose acetate, cellulose butyrate, cellulose acetate butyrate, cellulose phthalate, or cellulose nitrate;

a polyvinyl acetate derivative such as polyvinyl butyral, polyvinyl formal, or polyvinyl acetate;

a nitrogen-containing polymer derivative such as polyvinylpyridine, polyvinylpyrrolidone, or poly-2-methyl-2-oxazoline;

a polyvinyl halide derivative such as polyvinyl chloride or polyvinylidene chloride;

a polysiloxane derivative such as polydimethylsiloxane; and various emulsifiers such as a carbodiimide resin, an epoxy resin, a phenolic resin, a melamine resin, a urea resin, a urethane resin, polyethylene, polypropylene, polyamide, polyimide, polycarbonate, a liquid crystal polymer, polyethylene terephthalate, and polybutylene terephthalate.

Among those described above, the emulsifier is preferably a sugar such as a cellulose derivative, more preferably a cellulose derivative, and particularly preferably a cellulose ether such as ethyl cellulose.

The amount of use of the emulsifier in the case of using an emulsifier may be any amount with which a desired viscosity can be achieved for the second solution. The content of the emulsifier in the second solution is not particularly limited. The upper limit of the content of the emulsifier in the second solution is preferably 30% by mass, more preferably 20% by mass, even more preferably 10% by mass, and still more preferably 7% by mass. The lower limit of the content of the emulsifier in the second solution is preferably 0.1% by mass, more preferably 0.2% by mass, even more preferably 0.3% by mass, and still more preferably 0.5% by mass. The content is generally 0.1% to 30% by mass, preferably 0.2% to 20% by mass, preferably 0.3% to 20% by mass, preferably 0.3% to 15% by mass, more preferably 0.5% to 15% by mass, even more preferably 0.7% to 12.5% by mass, and particularly preferably 1.0% to 10% by mass.

The content of the emulsifier in the second solution is preferably 0.1% to 20% by mass, more preferably 0.1% to 10% by mass, even more preferably 0.2% to 7% by mass, still more preferably 0.3% to 5% by mass, and particularly preferably 0.4% to 3% by mass.

In the case of using an emulsifier, the second solution can be produced by dissolving an emulsifier in the above-described hydrophobic solvent.

Mixing and Stirring of First Solution and Second Solution

According to the present invention, the above-mentioned first solution and the above-mentioned second solution are mixed, and an emulsion of a nitrogen atom-containing polymer or a salt thereof is obtained. It is preferable that the mixed solution is stirred at a rate of 20 to 500 rotations/minute. According to the present invention, an emulsion of a nitrogen atom-containing polymer or a salt thereof, the emulsion having high emulsion stability and having a low dispersity of the particle diameter of emulsified particles, can be produced even under rotation at such a low speed.

The mass ratio of the use amounts of the first solution and the second solution is not particularly limited; however, the mass ratio of amount of use of the first solution:amount of use of the second solution is generally in the range of 5:1 to 1:10, preferably in the range of 2:1 to 1:10, more preferably in the range of 1:1 to 1:10, even more preferably in the range of 1:1 to 1:5, and particularly preferably in the range of 1:1 to 1:3.

Mixing of the first solution and the second solution can be carried out in a vessel such as a beaker. According to the present invention, it is preferable that the mixed solution obtained as described above is stirred at a rate of 20 to 500 rotations/minute. The vessel in which mixing and stirring are carried out may be the same vessel or may be different vessels.

The capacity of the vessel in which stirring is carried out is not particularly limited as long as the effects of the present invention can be achieved; however, the capacity is generally in the range of 100 mL to 100,000 L.

The temperature employed at the time of performing stirring is not particularly limited; however, the temperature is generally 2° C. to 98° C., preferably 5° C. to 80° C., and more preferably 10° C. to 70° C.

The stirring rate is preferably 20 to 500 rotations/minute, more preferably 30 to 400 rotations/minute, even more preferably 40 to 300 rotations/minute, and particularly preferably 50 to 300 rotations/minute.

Stirring can be carried out by a conventional method such as a method of using a stirring blade and a motor. The size of the stirring blade can be set as appropriate in accordance with the capacity of the vessel to be used. For instance, in a case in which stirring of a mixed solution is carried out in a 500-mL flask, a stirring blade having a blade diameter of about 40 mm to 100 mm can be used.

Regarding the ratio of the maximum internal diameter of the vessel and the length of the stirring blade, it is preferable that the length of the stirring blade with respect to the maximum internal diameter of the vessel (diameter in the case of a cylindrical vessel) is equal to or more than 3/10 and less than the maximum internal diameter, and more preferably from 5/10 to 9/10.

Even in a case in which the capacity of the vessel is changed, the stirring conditions can be adjusted by the speed of rotation. It is preferable that the stirring conditions are optimized by adjusting the size or shape of the stirring blade and the speed of rotation. For example, it is preferable that the speed of rotation is adjusted by means of the size and shape of the stirring blade, such as that in a case in which the stirring blade is large, the speed of rotation is set to a small value, and in a case in which the stirring blade is small, the speed of rotation is set to a large value.

The stirring time is not particularly limited and can be set as appropriate in accordance with the capacity of the vessel or the like; however, the stirring time is generally 1 minute to 10 hours, preferably 5 minutes to 5 hours, more preferably 10 minutes to 3 hours, and even more preferably 15 minutes to 2 hours.

The average particle diameter of emulsified particles of the emulsion of a nitrogen atom-containing polymer or a salt thereof obtainable by stirring described above is not particularly limited; however, the average particle diameter is preferably 1 to 200 μm, and more preferably 5 to 150 μm.

Regarding the measurement of the average particle diameter of the emulsified particles, measurement can be made according to a known technique, and for example, measurement can be carried out by the following method. An emulsion of a nitrogen atom-containing polymer or a salt thereof obtained by stirring is added dropwise into dry ice-methanol at −78° C. within 5 minutes from the termination of stirring, and particles of the nitrogen atom-containing polymer or a salt thereof are solidified. Optical microscopic photographs of 1,000 or more frozen particles that had been randomly selected are imaged and stored as electronic data, and the average particle diameter of the frozen particles is calculated using software ImageJ manufactured by the National Institutes of Health.

Alternatively, the average particle diameter can also be calculated by using an in-line particle diameter distribution analyzer such as PARTICLETRACK manufactured by Mettler-Toledo, Inc. Examples of PARTICLETRACK manufactured by Mettler-Toledo, Inc. include ParticleTrack G400 or G600B. By inserting an in-line sensor into the vessel during emulsification, a particle diameter distribution data is obtained on-time, and the average particle diameter of the emulsified particles can be calculated.

Emulsion

The emulsion of the embodiment of the present invention is an emulsion comprising spherical objects formed from a first solution that includes a nitrogen atom-containing polymer or a salt thereof and a hydrophilic solvent and has a viscosity of 10 to 2,000 mPa·s; and a dispersing medium including a second solution that includes a hydrophobic solvent and has a viscosity of 1 to 100 mPa·s, wherein the ratio between the viscosity of the first solution and the viscosity of the second solution is in the range of 0.1:1 to 300:1. Meanwhile, the emulsion may include, if necessary, a component other than the spherical objects or the dispersing medium.

The "nitrogen atom-containing polymer or a salt thereof", the "hydrophilic solvent", the "viscosity of the first solution", the "hydrophobic solvent", the "viscosity of the second solution", and the "ratio between the viscosity of the first solution and the viscosity of the second solution" are as described above in the present specification.

The spherical objects are formed from a first solution including a nitrogen atom-containing polymer or a salt thereof and a hydrophilic solvent and having a viscosity of 10 to 2,000 mPa·s, and the spherical objects are preferably spherical liquid droplets.

The dispersing medium is a medium including a second solution that includes a hydrophobic solvent and has a viscosity of 1 to 100 mPa·s, and is a medium that constitutes a continuous uniform phase in the emulsion.

An emulsion is a product in which the above-described spherical objects are dispersed in the above-described dispersing medium.

The emulsion of the embodiment of the invention can be produced by, for example, the method for producing an emulsion of a nitrogen atom-containing polymer or a salt thereof of the embodiment of the present invention. That is, the emulsion of the embodiment of the present invention can be produced by mixing a first solution that includes a nitrogen atom-containing polymer or a salt thereof and a hydrophilic solvent and has a viscosity of 10 to 2,000 mPa·s; and a second solution that includes a hydrophobic solvent and has a viscosity of 1 to 100 mPa·s (herein, the ratio between the viscosity of the first solution and the viscosity of the second solution is in the range of 0.1:1 to 300:1), and stirring the mixture. However, the method for producing an emulsion of the embodiment of the present invention is not particularly limited, and the emulsion of the embodiment of the present invention may be an emulsion produced by a production method other than that described above.

Use of Emulsion

The emulsion of a nitrogen atom-containing polymer or a salt thereof produced by the method of the embodiment of the present invention, and the uses of the emulsion of the embodiment of the present invention are not particularly limited; however, for example, the emulsion can be utilized in the fields described below.

Field of paper manufacture or paper processing; a paper-making reagent, a neutral sizing agent, and the like Field of adhesion or pressure-sensitive adhesion; a pressure-sensitive adhesive, a polyvinyl chloride (PVC) sol adhesive, a water-soluble adhesive, an anchor coating agent for compression lamination, an anchor coating agent for gas barrier, a release agent, and the like Field of coating material or ink; an alcohol-based ink for films, a water-based coating ink, and the like Field of fibers; a fixing agent, a functional fiber, a tire cord, a glass fiber sizing agent, a flame retardant, and the like.

Field of water purification; a liquid purifying agent, a flocculant, a bacterial body aggregating and separating agent, a chelating agent, and the like.

Field of gas purification; an air purifying agent and the like.

Field of dispersion; a dispersant and the like.

Field of plating or metal surface treatment; a plating bath agent, an electroless plating agent, a corrosion inhibitor for acid washing, a primary rust inhibitor, and the like.

Field of petroleum; a petroleum emulsion disrupting agent, a fluid loss agent, and the like.

Others; a foam fire extinguisher, a microencapsulating agent, an electronic conductive material, and the like.

Crosslinking

A crosslinking reaction of the nitrogen atom-containing polymer or a salt thereof may be carried out by subjecting the emulsion to a crosslinking step.

In the crosslinking step, (1) a crosslinking reaction can be carried out by adding a crosslinking agent to the emulsion, or (2) a crosslinking reaction can be carried out by mixing a crosslinking agent with the second solution in advance, subsequently mixing the first solution and the second solution, and emulsifying the mixture; however, there are no particular limitations.

The reaction time for the crosslinking step is preferably 1 to 36 hours, more preferably 3 to 24 hours, and particularly preferably 6 to 20 hours.

Regarding the crosslinking step, from the viewpoint of increasing the reaction ratio, it is desired that the crosslinking reaction is carried out after water in the first solution is removed. Therefore, it is preferable that the crosslinking reaction is carried out at a temperature of 95° C. or higher using a Dean-Stark trap or the like.

That is, it is preferable that after distillation of water is completed, the reaction is carried out for 1 to 24 hours. The reaction time is more preferably 2 to 20 hours, and particularly preferably 3 to 16 hours.

A crosslinking agent is usually a compound having at least two functional groups. It is preferable that the functional groups are selected from a halogen group, a carbonyl group, an epoxy group, an ester group, an acid anhydride group, an acid halide group, an isocyanate group, a vinyl group, and a chloroformate group.

Preferred examples of the crosslinking agent include diacrylates and dimethacrylates (for example, ethylene glycol diacrylate, propylene glycol diacrylate, butylene glycol diacrylate, ethylene glycol dimethacrylate, propylene glycol dimethacrylate, butylene glycol dimethacrylate, polyethylene glycol dimethacrylate, polyethylene glycol diacrylate, bisphenol A dimethacrylate, and bisphenol A diacrylate), acrylamides (methylenebisacrylamide, methylenebismethacrylamide, ethylenebisacrylamide, ethylenebismethacrylamide, and ethylidenebisacrylamide), divinylbenzene, halohydrins (epichlorohydrin, epibromohydrin, and dichlorohydrin), epoxides (1,2,3,4-diepoxybutane, 1,4-butanediol diglycidyl ether, 1,2-ethanediol diglycidyl ether, polyglycidyl acrylate, trimethylolpropane triglycidyl ether, glycerol polyglycidyl ether, pentaerythritol polyglycidyl ether, diglycerol polyglycidyl ether, polyglycerol polyglycidyl ether, sorbitol polyglycidyl ether, and triglycidyl isocyanurate), alkylene type crosslinking agents (1,2-dichloroethane, 1,2-dibromoethane, 1,3-dichloropropane, 1,3-dibromopropane, 1,4-dichlorobutane, 1,4-dibromobutane, 1,5-dichloropentane, 1,5-dibromopentane, 1,6-dichlorohexane, 1,6-dibromohexane, 1,6-bis(para-toluenesulfonyl) hexane, 1,7-dichloroheptane, 1,7-dibromoheptane, 1,8-dichorooctane, 1,8-dibromooctane, 1,9-dichlorononane, 1,9-dibromononane, 1,10-dichlorodecane, and 1,10-dibromodecane), aromatic dihalides (α,α'-p-dichloroxylene), isocyanates (toluene diisocyanate, hexamethylene diisocyanate, diphenylmethane diisocyanate, and isophorone diisocyanate), acid chlorides (succinyl dichloride, phthalic acid dichloride, isophthalic acid dichloride, terephthalic acid dichloride, trimellitic acid trichloride, acryloyl chloride, and 1,3,5-benzenetricarboxylic acid trichloride), methyl esters (dimethyl succinate, methyl 1,3, 5-benzenetricarboxylate, and methyl acrylate), acid anhydrides (pyromellitic anhydride, trimellitic anhydride, and trimellitic anhydride chloride), and triazine derivatives (2,4, 6-trichloro-1,3,5-triazine). Among these, alkylene type crosslinking agents are preferred; an alkylene type crosslinking agent having 3 to 12 carbon atoms is more preferred; and an alkylene type crosslinking agent having 5 to 7 carbon atoms is particularly preferred. Regarding the alkylene type crosslinking agent, a dihaloalkane is preferred.

Among those described above, 1,2-dichloroethane, 1,3-dichloropropane, 1,6-dichlorohexane, 1,6-dibromohexane, 1,7-dichloroheptane, 1,8-dichlorooctane, 1,10-dichlorodecane, epichlorohydrin, trimethylolpropane triglycidyl ether, 1,2,3,4-diepoxybutane, 1,2-ethanediol diglycidyl ether, and α,α'-p-dichloroxylene are particularly preferred, and 1,6-dichlorohexane and 1,6-dibromohexane are most preferred. By using such hydrophobic crosslinking agents, a superior effect of decreasing the serum phosphorus concentration tends to be exhibited. The amount of use of the crosslinking agent is generally preferably 0.5 to 30 mol %, more preferably 1 to 20 mol %, even more preferably 1.5 to 15 mol %, and particularly preferably 2% to 10%, with respect to the amount of amino groups in the crosslinked polymer. In the case of using 1,6-dichlorohexane and 1,6-dibromohexane, the amount of use is preferably 0.5 to 20 mol %, more preferably 1 to 10 mol %, even more preferably 1.25 to 8 mol %, and particularly preferably 1.5% to 6%, with respect to the amount of amino groups in the crosslinked polymer.

In the case of using an alkylene type crosslinking agent having 3 to 12 carbon atoms, the crosslinked polymer has a repeating unit B represented by the following Formula (4-1) or (4-2).

In a case in which the crosslinked polymer has a repeating unit B, the percentage content of the repeating unit B is preferably 1 to 10 mol %, more preferably 1.25 mol % to 8 mol %, and even more preferably 1.5 mol % to 6 mol %.

In the crosslinking step, the above-described crosslinking agent is diluted with a predetermined solvent to obtain a solution, and this crosslinking agent solution is used.

Regarding the solvent, a solvent similar to the hydrophobic solvent described above can be used. Preferred is an aromatic hydrocarbon-based solvent, and toluene is particularly preferred.

In the case of (1), a crosslinking agent solution is added dropwise to the emulsion for 0 to 240 minutes, and then the mixture is caused to react for 1 to 36 hours at 40° C. to 140° C. The reaction time is preferably 1 to 36 hours, more preferably 1 to 24 hours, and particularly preferably 6 to 20 hours.

Subsequently, the particles are washed with a predetermined solution and then filtered, and the particles thus obtained are dried. Thereby, crosslinked particles are obtained.

The crosslinked particles obtainable as described above are preferably spherical(globule), and in a case in which the crosslinked particles are caused to swell, the particles exhibit a core-shell structure. It is observed that the outer side of the core-shell structure has a structure in which the polymer is compact with a high degree of crosslinking, and the inner side has a structure in which the polymer is sparse with a low degree of crosslinking. The shell layer on the outer side has an effect of enhancing the permeation selectivity of phosphoric acid against competing adsorbates present in the body. Furthermore, it is speculated that as the inner core layer has flexible mobility, the crosslinked particles can adsorb phosphoric acid with high efficiency and have enhanced phosphoric acid adsorption ability.

Crosslinked Particles

Regarding the crosslinked particles, the upper limit of the average particle diameter in a water-dispersed state is preferably 200 µm, more preferably 150 µm, and particularly preferably 120 µm. The lower limit of the average particle diameter is preferably 10 µm, more preferably 20 µm, even more preferably 30 µm, particularly preferably 40 µm, and most preferably 50 µm. The average particle diameter is preferably 10 to 200 µm, more preferably 20 to 150 µm, even more preferably 30 to 120 µm, particularly preferably 40 to 120 µm, and most preferably 50 to 120 µm. In a case in which this value range is satisfied, a superior effect of decreasing the serum phosphorus concentration tends to be exhibited. Furthermore, since the emulsion of the embodiment of the present invention has a low dispersity of the particle diameter of emulsified particles, uniform spherical crosslinked particles can be obtained even from crosslinked particles having such an average particle diameter.

Regarding the crosslinked particles, the upper limit of the swelling rate is preferably 20 mL/g, more preferably 16 mL/g, and even more preferably 14 mL/g. The lower limit of the swelling rate is preferably 8 mL/g, more preferably 9 mL/g, and even more preferably 10 mL/g. The swelling rate is preferably 8 to 20 mL/g, more preferably 9 to 16 mL/g, and even more preferably 10 to 14 mL/g. As this value range is satisfied, a superior effect of decreasing the serum phosphorus concentration tends to be exhibited.

Regarding the particles, the upper limit of the degree of circularity is 1. The lower limit of the degree of circularity is preferably 0.80, and more preferably 0.90. As this value range is satisfied, a superior effect of decreasing the serum phosphorus concentration tends to be exhibited. Meanwhile, the degree of circularity can be calculated as an average value from 50 or more particle images in a water-dispersed state of optical microscopic photographs. From the results of identification with an optical microscope, it was considered for individual particles that as the degree of circularity was closer to 1, the particles were closer to a true spherical shape. Furthermore, it can be considered that as the average value from 50 or more particle images in a water-dispersed state is closer to 1, the percentage content of non-spherical particles is lower, and the percentage content of spherical particles is higher.

Regarding the measurement of physical properties such as the average particle diameter, the swelling rate, and the degree of circularity, measurement can be made by methods similar to the methods described in the Examples. Specifically, the average particle diameter is a value obtained by converting diameters from the areas of 1,000 or more particle images in a water-dispersed state of optical microscopic photographs, and calculating the average particle diameter as the volume average particle diameter using the diameters. The swelling rate is a value calculated by swelling particles by repeating shaking and standing for one hour or longer in an aqueous solution at pH 6.3 of 2.2% by mass of sodium 2-morpholinoethanesulfonate and 0.5% by mass of sodium chloride at 20° C. twenty or more times, and dividing the particle volume after swelling by the particle mass before swelling. The degree of circularity is an average value of the degree of circularity: $4\lambda \times (area)/(square\ of\ circumference)$, of 1,000 or more particle images of optical microscopic photographs.

Preferably, the crosslinked particles have a sparse and dense structure in which each particle has an outer shell portion and a central portion, and the amount of existence of crosslinked polymer in the central portion is smaller than the amount of existence of crosslinked polymer in the outer shell portion. Furthermore, preferably, the particles are such that each particle has an outer shell portion and a central portion, and the degree of crosslinking of the central portion is lower than the degree of crosslinking of the outer shell portion. The degree of crosslinking refers to the content proportion of a repeating unit having a crosslinked structure in the crosslinked polymer. In the case of a crosslinked polymer having at least a repeating unit A and a repeating unit B, the degree of crosslinking refers to the content proportion of the repeating unit B. The sparse and dense structure of a crosslinked polymer can be evaluated by freeze-drying a swollen particle and observing a scanning electron microscopic image of a cross-section of the particle. In the scanning electron microscopic image, the particle exhibits a two-layer structure. Since the outer shell portion does not have pores, the outer shell portion appears in black, while the inner portion appears in white because a large number of pores exist in the inner portion. The region where pores do not exist is a region having a large amount of existence of crosslinked polymer, and the region where a large number of pores exist is a region having a small amount of existence of crosslinked polymer. Furthermore, the region where pores do not exist is a region having a high degree of crosslinking, and the region where a large number of pores exist is a region having a low degree of crosslinking.

It is speculated that the region where pores do not exist is not likely to swell because the degree of crosslinking is high, and even swollen particles have a large amount of existence of crosslinked polymer. Meanwhile, it is speculated that the region where a large number of pores exist is likely to swell because the degree of crosslinking is low, and in a case in which swollen particles are freeze-dried, a large number of pores are produced in the swollen region, and the amount of existence of crosslinked polymer is decreased.

The crosslinked particles may partially include, in addition to the particles having the predetermined shape, particles having a shape other than the predetermined shape and containing a crosslinked polymer, and crushed particles containing a crosslinked polymer. It is preferable that the crosslinked particles include the particles having the predetermined shape at a proportion of 50% by mass or more, more preferably at a proportion of 70% by mass or more, even more preferably at a proportion of 90% by mass or more, and particularly preferably at a proportion of 95% by mass or more, based on the total amount of particles.

The crosslinked particles preferably contain a crosslinked polymer having a substituent containing an $NR^{A1}R^{A2}$ structure, or a salt thereof. Here, $R^{A1}$ and $R^{A2}$ each independently represent a hydrogen atom, an alkyl group having 1 to 20 carbon atoms, an aminoalkyl group having 1 to 20 carbon atoms or a salt thereof, an alkylaminoalkyl group having 2 to 20 carbon atoms or a salt thereof, a dialkylaminoalkyl group having 3 to 20 carbon atoms or a salt thereof, a trialkylammoniumalkyl group having 4 to 20 carbon atoms, an alkylcarbonyl group having 1 to 20 carbon atoms, a carboxyalkyl group having 1 to 20 carbon atoms or a hydroxyalkyl group having 1 to 20 carbon atoms.

Preferably, the crosslinked particles are particles containing a crosslinked polymer having at least a repeating unit A represented by the following Formula (3-1) or (3-2) and a repeating unit B represented by the following Formula (4-1) or (4-2) (hereinafter, also referred to as crosslinked polymer particles):

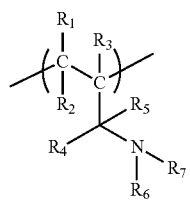
(3-1)

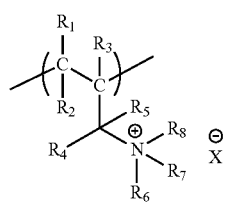
(3-2)

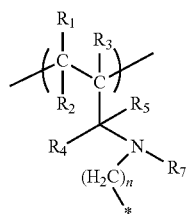
(4-1)

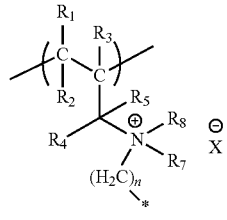
(4-2)

wherein $R_1$, $R_2$, $R_3$, $R_4$, and $R_5$ each independently represent a hydrogen atom, a halogen atom, or an alkyl group having 1 to 20 carbon atoms;

$R_6$, $R_7$, and $R_8$ each independently represent a hydrogen atom, an alkyl group having 1 to 20 carbon atoms, an aminoalkyl group having 1 to 20 carbon atoms or a salt thereof, an alkylaminoalkyl group having 2 to 20 carbon atoms or a salt thereof, a dialkylaminoalkyl group having 3 to 20 carbon atoms or a salt thereof, a trialkylammoniumalkyl group having 4 to 20 carbon atoms, an alkylcarbonyl group having 1 to 20 carbon atoms, a carboxyalkyl group having 1 to 20 carbon atoms, or a hydroxyalkyl group having 1 to 20 carbon atoms;

$X^-$ represents a negatively charged counterion;

n represents an integer from 5 to 7; and the symbol * means a linking bond to a nitrogen atom of a side chain of the repeating unit A.

$X^-$ is a negatively charged counterion and represents F$^-$, Cl$^-$, Br$^-$, I$^-$, $PO_4^{3-}$, $PO_3^{3-}$, $CO_3^{2-}$, $HCO_3^-$, $SO_4^{2-}$, $HSO_4^-$, $OH^-$, $NO_3^-$, $S_2O_8^{2-}$, $SO_3^{2-}$, $CH_3CO_2^-$, or the like. $X^-$ is particularly preferably Cl$^-$, $CO_3^{2-}$, or $HCO_3^-$.

n is particularly preferably 6.

$R_1$, $R_2$, $R_3$, $R_4$, and $R_5$ are each independently preferably a hydrogen atom or an alkyl group having 1 to 20 carbon atom, and particularly preferably a hydrogen atom.

$R_6$, $R_7$, and $R_8$ are each independently preferably a hydrogen atom or an alkyl group having 1 to 20 carbon atoms, and particularly preferably a hydrogen atom.

It is preferable that in the crosslinked polymer, the content of the repeating unit A is 90 to 99 mol %, and the content of the repeating unit B is 1 to 10 mol %.

The crosslinked particles obtainable as described above preferably have a true spherical shape, and since the uniformity of the shape is high, the crosslinked particles can be utilized in the various use applications and fields described above. Furthermore, among those described above, crosslinked spherical polyallylamine particles are particularly highly useful since the particles have phosphorus-adsorbing action.

The present invention will be described more specifically by way of the following Examples; however, the present invention is not intended to be limited to the Examples.

EXAMPLES

Example 1

213 g of a 15.0% by mass aqueous solution of polyallylamine (PAA-15C manufactured by Nittobo Medical Co., Ltd., amine value 17.5 mmol/g) was treated such that water was distilled off under reduced-pressure, and thereby 80.0 g of a 40.0% by mass aqueous solution of polyallylamine (first solution) was produced.

200 g of a second solution was produced by dissolving 10.0 g of ethyl cellulose (ETHYL CELLULOSE (about 49% ethoxy) 10 manufactured by Wako Pure Chemical Industries, Ltd., weight-average molecular weight is 72,000) in 190 g of toluene.

The first solution and the second solution were mixed in a 500-mL separable flask (cylindrical flat-bottom type manufactured by Sibata Scientific Technology, Ltd., product No. 005820-500), and thus a mixture was obtained. The mixture was stirred for 30 minutes at 25° C. at a speed of 150 rotations/minute using a flat type stirring blade made of stainless steel (R1375 manufactured by IKA Works GmbH & Co. KG, blade diameter 70 mm) and a THREE-ONE MOTOR (BL600) manufactured by Shinto Scientific Co., Ltd., and thereby a polyallylamine emulsion was obtained.

Examples 2 to 4

Polyallylamine emulsions were obtained in the same manner as in Example 1, except that the speed of rotation of stirring was changed from 150 rotations/minute to 50 rotations/minute (Example 2), 300 rotations/minute (Example 3), or 500 rotations/minute (Example 4).

Examples 5 and 6

Polyallylamine emulsions were obtained in the same manner as in Example 1, except that 200 g of the second solution were produced by changing the amounts of use of ethyl cellulose and toluene as follows.

TABLE 1

|  | Amount of use of ethyl cellulose (g) | Amount of use of toluene (g) |
| --- | --- | --- |
| Example 5 | 3.80 g | 196 g |
| Example 6 | 12.4 g | 187 g |

Examples 7 to 9

Polyallylamine emulsions were obtained in the same manner as in Example 1, except that 80.0 g of a 15.0% by mass aqueous solution of polyallylamine (PAA-15C manufactured by Nittobo Medical Co., Ltd.) was directly used as the first solution, and 200 g of the second solution was produced by changing the amounts of use of ethyl cellulose and toluene as follows.

TABLE 2

|  | Amount of use of ethyl cellulose (g) | Amount of use of toluene (g) |
| --- | --- | --- |
| Example 7 | 3.80 g | 196 g |
| Example 8 | 6.00 g | 194 g |
| Example 9 | 10.0 g | 190 g |

Example 10

A polyallylamine emulsion was obtained in the same manner as in Example 1, except that 80.0 g of a 40.0% by mass aqueous solution of polyallylamine produced by distilling off water under reduced-pressure from 160 g of a 20.0% by mass aqueous solution of polyallylamine (PAA-03 manufactured by Nittobo Medical Co., Ltd., amine value 17.5 mmol/g) was used as the first solution, and 200 g of the second solution was produced using 6.00 g of ethyl cellulose and 194 g of toluene.

Example 11

A polyallylamine emulsion was obtained in the same manner as in Example 1, except that 80.0 g of a 20.0% by mass aqueous solution of polyallylamine (PAA-03 manufactured by Nittobo Medical Co., Ltd., amine value 17.5 mmol/g) was directly used as the first solution, and 200 g of the second solution was produced using 6.00 g of ethyl cellulose and 194 g of toluene.

Example 12

A polyvinylamine emulsion was obtained in the same manner as in Example 1, except that a 10.0% by mass aqueous solution of polyvinylamine (PVAM-0595B manufactured by Mitsubishi Rayon Co., Ltd., amine value 22.7 mmol/g) was directly used as the first solution.

Example 13

A polyethyleneimine emulsion was obtained in the same manner as in Example 1, except that a 30.0% by mass aqueous solution of polyethyleneimine (P-1000 manufactured by Nippon Shokubai Co., Ltd., amine value 22.7 mmol/g) was directly used as the first solution.

Example 14

A polyallylamine emulsion was obtained in the same manner as in Example 1, except that 10.0 g of polystyrene (441147 manufactured by Sigma-Aldrich Corporation, weight-average molecular weight 350,000) was used instead of 10.0 g of ethyl cellulose.

Example 15

A polyallylamine emulsion was obtained in the same manner as in Example 1, except that 10.0 g of polymethyl methacrylate (445746 manufactured by Sigma-Aldrich Corporation, weight-average molecular weight 350,000) was used instead of 10.0 g of ethyl cellulose.

Example 16

A polyallylamine emulsion was obtained in the same manner as in Example 1, except that 200 g of the second solution was produced by dissolving 12.0 g of cellulose propionate (330183 manufactured by Sigma-Aldrich Corporation, number-average molecular weight 75,000) in 188 g of butyl acetate.

Example 17

A polyallylamine emulsion was obtained in the same manner as in Example 1, except that 200 g of the second solution was produced by dissolving 24.0 g of cellulose propionate (330183 manufactured by Sigma-Aldrich Corporation, number-average molecular weight 75,000) in 176 g of ethyl acetate.

Example 18

A polyallylamine emulsion was obtained in the same manner as in Example 1, except that 200 g of the second solution was produced by dissolving 10.0 g of ethyl cellulose in 190 g of xylene.

Example 19

A polyallylamine emulsion was obtained in the same manner as in Example 1, except that 200 g of the second solution was produced by dissolving 10.0 g of ethyl cellulose in 190 g of butyl acetate.

Example 20

A polyallylamine emulsion was obtained in the same manner as in Example 1, except that 200 g of olive oil was used as the second solution.

Example 21

A polyallylamine emulsion was obtained in the same manner as in Example 1, except that a mixture of the first solution and the second solution was stirred at 60° C.

Example 22

An emulsion of polyallylamine hydrochloride was obtained in the same manner as in Example 1, except that 105 g of a 40.0% by mass aqueous solution of polyallylamine hydrochloride (first solution, amine value 13.3 mmol/g) was produced by adding 140 ml of 2 M hydrochloric acid to 213 g of a 15.0% by mass aqueous solution of polyallylamine (PAA-15C manufactured by Nittobo Medical Co., Ltd.) with stirring, and distilling off water under reduced-pressure.

Comparative Example 1

Production of a polyallylamine emulsion was attempted in the same manner as in Example 2 of JP1988-045721B (JP-S63-045721B).

An aqueous solution of polyallylamine (solution A) was produced by dissolving 196 g (2 mol) of polyallylamine hydrochloride (PAA-HCl) produced by the method described in Reference Example of JP1988-045721B (JP-S63-045721B) in 160 g of a 25% by mass aqueous solution of sodium hydroxide.

Next, into a 500-mL separable flask (cylindrical flat bottom type manufactured by Sibata Scientific Technology, Ltd., product No. 005820-500), 200 mL of chlorobenzene, 100 mL of o-dichlorobenzene, and 2 g of sorbitan sesquioleate (manufactured by Matsumoto Yushi-Seiyaku Co., Ltd., trade name SYLVAN S-83) were introduced.

Next, a mixture obtained by adding 1.58 g of epichlorohydrin into 50 g of the solution A was stirred and mixed for about 2 minutes, and then the mixture was added to the 500-mL separable flask described above. The mixture was emulsified by stirring the mixture for 30 minutes at 25° C. at a speed of 600 rotations/minute using a flat type stirring blade made of stainless steel (R1375 manufactured by IKA GmbH & Co. KG, blade diameter 70 mm) and THREE-ONE MOTOR (BL600) manufactured by Shinto Scientific Co., Ltd.

Comparative Example 2

A polyallylamine emulsion was obtained in the same manner as in Example 1, except that 10.0 g of sorbitan sesquioleate (manufactured by Matsumoto Yushi-Seiyaku Co., Ltd., trade name SYLVAN S-83) was used instead of 10.0 g of ethyl cellulose, and the speed of rotation of stirring was changed from 150 rotations/minute to 600 rotations/minute.

Comparative Example 3

A polyallylamine emulsion was obtained in the same manner as in Example 1, except that 200 g of the second solution was produced using 2.20 g of ethyl cellulose and 198 g of toluene.

Comparative Example 4

A polyallylamine emulsion was obtained in the same manner as in Example 1, except that 80.0 g of a 15.0% by mass aqueous solution of polyallylamine (PAA-15C manufactured by Nittobo Medical Co., Ltd.) was directly used as the first solution, and 200 g of the second solution was produced using 16.4 g of ethyl cellulose and 184 g of toluene.

Comparative Example 5

A polyallylamine emulsion was obtained in the same manner as in Example 1, except that 80.0 g of a 15.0% by mass aqueous solution of polyallylamine (PAA-15C manufactured by Nittobo Medical Co., Ltd.) was directly used as the first solution, and the second solution was produced with 200 g of toluene only without using an emulsifier.

[Measurement of Viscosity]

Viscosity at 25° C. was measured using an R215 type viscometer (RE-215L) manufactured by Toki Sangyo Co., Ltd. In a case in which the viscosity was higher than 100 mPa·s, the viscosity was measured with a sample amount of 0.6 ml using a cone rotor for high viscosity (3°×R9.7). In a case in which the viscosity was lower than 100 mPa·s, the viscosity was measured with a sample amount of 0.2 ml using a cone rotor for low viscosity (0.8°×R24). The speed of rotation was set such that the torque index value (TQ) would be stabilized in the range of 50% to 100%, and the viscosity was read out.

[Emulsion Stability]

The emulsified state immediately after the completion of stirring and the emulsified state after standing for one hour of each of the emulsions obtained in various Examples and various Comparative Examples were compared by visual inspection.

A: No change is seen, and an emulsified state is maintained.

B: An emulsified state is maintained in the majority; however, coagulation proceeds in a portion, and generation of emulsion droplets having a size of 1 mm or more, which are visually recognizable, is confirmed.

C: An emulsified state was lost, and the system is separated into two layers.

[Results of evaluation]

The results of the evaluation as described above are shown in the following table. The molecular weight in the table is weight-average molecular weight.

TABLE 3

|  | Composition of first solution | Viscosity of first solution (mPa · s) | Hydrophobic solvent | Emulsifier |
| --- | --- | --- | --- | --- |
| Example 1 | 40% by mass aqueous solution of polyallylamine (molecular weight 15,000) | 1377 | Toluene | Ethyl cellulose (5% by mass) |
| Example 2 | 40% by mass aqueous solution of polyallylamine (molecular weight 15,000) | 1377 | Toluene | Ethyl cellulose (5% by mass) |
| Example 3 | 40% by mass aqueous solution of polyallylamine (molecular weight 15,000) | 1377 | Toluene | Ethyl cellulose (5% by mass) |
| Example 4 | 40% by mass aqueous solution of polyallylamine (molecular weight 15,000) | 1377 | Toluene | Ethyl cellulose (5% by mass) |

TABLE 3-continued

| | Composition of first solution | Viscosity of first solution (mPa·s) | Hydrophobic solvent | Emulsifier |
|---|---|---|---|---|
| Example 5 | 40% by mass aqueous solution of polyallylamine (molecular weight 15,000) | 1377 | Toluene | Ethyl cellulose (1.9% by mass) |
| Example 6 | 40% by mass aqueous solution of polyallylamine (molecular weight 15,000) | 1377 | Toluene | Ethyl cellulose (6.2% by mass) |
| Example 7 | 15% by mass aqueous solution of polyallylamine (molecular weight 15,000) | 21 | Toluene | Ethyl cellulose (1.9% by mass) |
| Example 8 | 15% by mass aqueous solution of polyallylamine (molecular weight 15,000) | 21 | Toluene | Ethyl cellulose (3% by mass) |
| Example 9 | 15% by mass aqueous solution of polyallylamine (molecular weight 15,000) | 21 | Toluene | Ethyl cellulose (5% by mass) |
| Example 10 | 40% by mass aqueous solution of polyallylamine (molecular weight 3,000) | 177 | Toluene | Ethyl cellulose (3% by mass) |

| | Viscosity of second solution (mPa·s) | Viscosity ratio (first/second) | Speed of rotation (rotations/minute) | Emulsion stability |
|---|---|---|---|---|
| Example 1 | 55 | 25 | 150 | A |
| Example 2 | 55 | 25 | 50 | A |
| Example 3 | 55 | 25 | 300 | A |
| Example 4 | 55 | 25 | 500 | A |
| Example 5 | 5 | 275 | 150 | B |
| Example 6 | 98 | 14 | 150 | A |
| Example 7 | 5 | 4.2 | 150 | A |
| Example 8 | 12 | 1.75 | 150 | B |
| Example 9 | 55 | 0.38 | 150 | B |
| Example 10 | 12 | 14.8 | 150 | A |

TABLE 4

| | Composition of first solution | Viscosity of first solution (mPa·s) | Hydrophobic solvent | Emulsifier |
|---|---|---|---|---|
| Example 11 | 20% by mass aqueous solution of polyallylamine (molecular weight 3,000) | 11 | Toluene | Ethyl cellulose (3% by mass) |
| Example 12 | 10% by mass aqueous solution of polyvinylamine (molecular weight 60,000) | 750 | Toluene | Ethyl cellulose (5% by mass) |
| Example 13 | 30% by mass aqueous solution of polyethyleneimine (molecular weight 70,000) | 560 | Toluene | Ethyl cellulose (5% by mass) |
| Example 14 | 40% by mass aqueous solution of polyallylamine (molecular weight 15,000) | 1377 | Toluene | Polystyrene (5% by mass) |
| Example 15 | 40% by mass aqueous solution of polyallylamine (molecular weight 15,000) | 1377 | Toluene | Polymethyl methacrylate (5% by mass) |
| Example 16 | 40% by mass aqueous solution of polyallylamine (molecular weight 15,000) | 1377 | Butyl acetate | Cellulose propionate (6% by mass) |
| Example 17 | 40% by mass aqueous solution of polyallylamine (molecular weight 15,000) | 1377 | Ethyl acetate | Cellulose acetate propionate (12% by mass) |
| Example 18 | 40% by mass aqueous solution of polyallylamine (molecular weight 15,000) | 1377 | Xylene | Ethyl cellulose (5% by mass) |
| Example 19 | 40% by mass aqueous solution of polyallylamine (molecular weight 15,000) | 1377 | Butyl acetate | Ethyl cellulose (5% by mass) |
| Example 20 | 40% by mass aqueous solution of polyallylamine (molecular weight 15,000) | 1377 | Olive oil | None |
| Example 21 | 40% by mass aqueous solution of polyallylamine (molecular weight 15,000) | 1377 | Toluene | Ethyl cellulose (5% by mass) |
| Example 22 | 40% by mass aqueous solution of polyallylamine (molecular weight 15,000) hydrochloride | 1450 | Toluene | Ethyl cellulose (5% by mass) |

| | Viscosity of second solution (mPa·s) | Viscosity ratio (first/second) | Speed of rotation (rotations/minute) | Emulsion stability |
|---|---|---|---|---|
| Example 11 | 12 | 0.92 | 150 | A |
| Example 12 | 55 | 13.6 | 150 | A |
| Example 13 | 55 | 10.2 | 150 | A |
| Example 14 | 70 | 19.7 | 150 | A |
| Example 15 | 65 | 21.2 | 150 | A |
| Example 16 | 53 | 26.0 | 150 | A |
| Example 17 | 77 | 17.9 | 150 | A |
| Example 18 | 36 | 38.3 | 150 | B |
| Example 19 | 34 | 40.5 | 150 | B |
| Example 20 | 18 | 76.5 | 150 | B |
| Example 21 | 55 | 25 | 150 (60° C.) | A |
| Example 22 | 55 | 26.3 | 150 | A |

TABLE 5

| | Composition of first solution | Viscosity of first solution (mPa·s) | Hydrophobic solvent | Emulsifier |
|---|---|---|---|---|
| Comparative Example 1 (JP1988-045721B Example 2) | Reaction mixture of polyallylamine and epichlorohydrin | 2355 | Chlorobenzene/ o-dichlorobenzene | Sorbitan sesquioleate (0.7% by mass) |
| Comparative Example 2 | 40% by mass aqueous solution of polyallylamine (molecular weight 15,000) | 1377 | Toluene | Sorbitan sesquioleate (5% by mass) |
| Comparative Example 3 | 40% by mass aqueous solution of polyallylamine (molecular weight 15,000) | 1377 | Toluene | Ethyl cellulose (1.1% by mass) |
| Comparative Example 4 | 15% by mass aqueous solution of polyallylamine (molecular weight 15,000) | 21 | Toluene | Ethyl cellulose (8.2% by mass) |
| Comparative Example 5 | 15% by mass aqueous solution of polyallylamine (molecular weight 15,000) | 21 | Toluene | None |

| | Viscosity of second solution (mPa·s) | Viscosity ratio (first/second) | Speed of rotation (rotations/minute) | Emulsion stability |
|---|---|---|---|---|
| Comparative Example 1 (JP1988-045721B Example 2) | 0.6 | 3925 | 600 | C |
| Comparative Example 2 | 0.6 | 2295 | 600 | C |
| Comparative Example 3 | 1.8 | 765 | 150 | C |
| Comparative Example 4 | 300 | 0.07 | 150 | C |
| Comparative Example 5 | 0.6 | 35 | 150 | C |

Example 2-1: Reaction of Polymer Amine 280 g of the polyallylamine emulsion obtained in Example 8 was cooled to 5° C. while being continuously stirred, and 5.90 g of benzoyl chloride (Wako Pure Chemical Industries, Ltd.) corresponding to 20% equivalent of the total amount of amino groups was added dropwise thereto for one hour. Subsequently, the mixture was caused to react for one hour, subsequently the temperature was raised to 25° C., and the mixture was further caused to react for one hour. The reaction mixture thus obtained was centrifuged, and a toluene layer was removed by decantation and concentrated. Subsequently, 120 mL of methanol was added to the resultant, and the mixture was mixed until the mixture became uniform. The mixture was added dropwise into a vessel holding 5 L of ethyl acetate and was subjected to reprecipitation. Subsequently, the resultant was filtered and dried, and thus a polymer was obtained. The polymer was analyzed by $^1$H NMR, and it was confirmed that 100% of benzoyl chloride used reacted with polyallylamine.

Comparative Example 2-1

The polyallylamine emulsion obtained in Comparative Example 5 was reacted with benzoyl chloride in the same manner as in Example 2-1, and in the benzoyl chloride used, the portion that reacted with polyallylamine was 39% only.

Summary of Examples 1 to 22, Comparative Examples 1 to 5, and Example 2-1

In Examples 1 to 22, which satisfy the condition that a mixed solution obtained by mixing a first solution including a nitrogen atom-containing polymer or a salt thereof and a hydrophilic solvent and having a viscosity of 10 to 2,000 mPa·s, with a second solution including a hydrophobic solvent and having a viscosity of 1 to 2,000 mPa·s, where the ratio of first solution viscosity/second solution viscosity is 0.1 to 300, is stirred, the evaluation of emulsion stability was satisfactory (rating was A or B), and the average particle diameter of emulsified particles was suspected to be 1 to 200 μm. The dispersity of the average particle s diameter of emulsified particles was also low and satisfactory.

On the other hand, in Comparative Examples 1 and 2 in which the viscosity of the second solution was 0.6 mPa·s and the ratio of first solution viscosity/second solution viscosity was larger than 300, the emulsion stability was rated as C. It is speculated that the dispersity was poor, and the average particle diameter of emulsified particles was larger than the desired value. In Comparative Example 3 in which the viscosity of the second solution was 1.8 mPa·s, the emulsion stability was poor (rating was C), and the system was separated into two layers. In Comparative example 3 in which the ratio of first solution viscosity/second solution viscosity was 765, the emulsion stability was rated as C. Furthermore, it is speculated that the average particle diameter of emulsified particles was large, and the dispersity was poor. In Comparative Example 4 in which the ratio of first solution viscosity/second solution viscosity was 0.07, the emulsion stability was rated as C. It is speculated that the average particle diameter of emulsified particles was small, and the dispersity was poor. In Comparative Example 5, the viscosity of the second solution was 0.6, and the emulsion stability was poor (rating was C).

While the reaction ratio of benzoyl chloride was 100% in Example 2-1, the reaction ratio of benzoyl chloride in Comparative Example 2-1 was 39%. It is understood that in the case of performing a modification reaction using the emulsion of the embodiment of the present invention, the reaction ratio of an amino group and benzoyl chloride is higher than in the case in which a modification reaction is carried out using the emulsion of the Comparative Example.

Example 31: Production of Crosslinked Particles

To each of the emulsions obtained in Examples 1 to 22, a solution obtained by diluting 7.93 g of 1,3-dichloropropane (manufactured by Tokyo Chemical Industry Co., Ltd.) with 10 mL of toluene is added dropwise for 5 minutes. After completion of the dropwise addition, the bath temperature is raised to 120° C., and the mixture is heated to reflux for 4 hours. Thereby, 74 mL of water is removed. The flask temperature is cooled to room temperature, and the supernatant is eliminated by decantation. The particles thus obtained are purified using ethanol (500 mL, three times), a 1 N aqueous solution of NaOH:water (60 mL:440 mL, one time), water (500 mL, two times), and ethanol (500 mL, one time), by repeating re-slurrifying and filtration for each of the solvents. The particles thus obtainable are dried in a blast dryer for 48 hours at 50° C. and in a vacuum dryer for 12 hours at 70° C. As the result, a crosslinking reaction proceeds, and crosslinked spherical polymer particles are obtained.

Example 32: Production of Crosslinked Particles

Crosslinked polymer particles are obtained in the same manner as in Example 31, except that 1,2-dichloroethane, 1,6-dichlorohexane, and 1,6-dibromohexane are used instead of 1,3-dichloropropane used in Example 31.

Example 41 to Example 54

Hereinafter, Examples of crosslinked particles will be described in more detail.
[Swelling Rate of Particles]
The swelling rate is calculated by repeating shaking and standing for one hour or longer in an aqueous solution at pH 6.3 of 2.2% by mass of sodium 2-morpholinoethanesulfonate and 0.5% by mass of sodium chloride at 20° C. twenty or more times, and dividing the particle volume after swelling by the particle mass before swelling.

Regarding the number of times of repeating shaking and standing for one hour or longer, the processes may be carried out until there is no detectable change in the volume of swollen particles.

More specifically, in a 1-L graduated flask, 21.7 g of sodium 2-morpholinoethanesulfonate (manufactured by Sigma-Aldrich, Inc.) and 4.7 g of sodium chloride (manufactured by Wako Pure Chemical Industries, Ltd.) were weighed, and water was added thereto to make up 1 L. After the compounds were completely dissolved, the buffer was produced by adding 30% by mass hydrochloric acid until the pH reached 6.3.

0.30 g of the particles obtained in each of the Examples were weighed in a 10-mL graduated cylinder, and the particles were mixed with 10 mL of the buffer. The particles were evenly suspended by stirring the mixture for one minute using a spatula, and then the mixture was left to stand. After 24 hours, the volume of the settled swollen particles was read from the scales of the graduated cylinder, and then the mixture was subjected to weak shaking for one minute and then was left to stand for another 24 hours. The above-described processes of shaking and standing were repeatedly carried out until no change in the volume of the swollen particles was detected. The swelling rate (mL/g) was calculated by dividing the volume of the swollen particles at the time when no change was detected, by the particle mass (0.30 g).

[Shape of Particles]
The shape of the particles was determined from optical microscopic photographs. More specifically, the particles obtained in each of the Examples were dispersed in water, and then optical microscopic (ECLIPSE E600POL manufactured by Nikon Corporation) photographs of 500 or more particles that had been randomly selected were imaged. In a case in which the projected area of approximately circular particles was 60% or more of the total projected area of particles in the photographs, those particles were considered spherical. The projected area of approximately circular particles is preferably 80% or more, more preferably 90% or more, and even more preferably 95% or more. It is more preferable as the projected area of approximately circular particles is larger.

Regarding the dispersing in water, an aqueous dispersion liquid was produced by weighing 0.1 g of dried particles in a sample bottle, adding 10 mL of pure water thereto, mixing the mixture by shaking, and then leaving the mixture to stand for 10 minutes at 25° C.

[Average Particle Diameter of Particles]
The average particle diameter is determined by converting diameters from the areas of 1,000 or more particle images in a water-dispersed state of optical microscopic photographs, and calculating the average particle diameter as the volume average particle diameter using the diameters.

More specifically, the particles obtained in each of the Examples were dispersed in water, subsequently optical microscopic (ECLIPSE E600POL manufactured by Nikon Corporation) photographs of randomly selected 1,000 or more particles were imaged and stored as electronic data, and the average particle diameter of the particles was calculated using the software ImageJ manufactured by the National Institutes of Health.

Meanwhile, regarding the dispersing in water, an aqueous dispersion liquid was produced by weighing 0.1 g of dried particles in a sample bottle, adding 10 mL of pure water, mixing the mixture by shaking, and then standing the mixture for 10 minutes at 25° C.

Regarding the imaging with an optical microscope, reflected light was observed at a magnification ratio of 50 times (ocular lens 10 times, object lens 5 times). In a case in which the number of particles per sheet was less than 1,000, a plurality of sheets of photographs was analyzed, and the numbers were summed.

In regard to the particle analysis with ImageJ,
(a) a photograph imaged with an optical microscope is scanned using ImageJ;
(b) the photograph is subjected to a smoothing treatment, a conversion treatment into an 8-bit image, bichromatization on the grayscale, a makeup treatment, and a splitting treatment of bound particles; and
(c) in order to eliminate noises, the range of analysis was limited to a particle diameter of 10 μm or more and a degree of circularity of 0.5 or greater, and the analysis treatment was carried out.

The dispersity was evaluated by calculating the CV value of the particle diameter data group used for the analysis of the average particle diameter.

The CV value represents a value obtained by dividing the standard deviation σ by the average particle diameter μ.

$CV = \sigma/\mu$

Explanations for σ and μ are as follows.
A population of n pieces of data such as $x_1, x_2, \ldots$, and $x_n$ is considered. The average of the population (or the population mean) is defined as follows.

$$\mu = \frac{1}{n}\sum_{i=1}^{n} x_i.$$

At this time, the amount $\sigma^2$ obtainable by the following formula using the population mean $\mu$ is defined as variance (or population variance).

$$\sigma^2 = \frac{1}{n}\sum_{i=1}^{n}(x_i - \mu)^2 = \frac{1}{n}\sum_{i=1}^{n}x_i^2 - \mu^2.$$

[Degree of Circularity of Particle]

The degree of circularity is an average value of the degree of circularity: $4\pi \times$(area)/(square of circumference) of 50 or more particle images of an optical microscopic photograph. In a case in which the degree of circularity is 1, it is implied that the shape is a perfect circle.

More specifically, the particles obtained in each of the Examples were dispersed in water, subsequently optical microscopic (ECLIPSE E600POL manufactured by Nikon Corporation) photographs of randomly selected 50 or more particles were imaged and stored as electronic data, and the degree of circularity of the particles was calculated using the software ImageJ manufactured by the National Institutes of Health.

Regarding the dispersing in water, an aqueous dispersion liquid was produced by weighing 0.1 g of dried particles in a sample bottle, adding 10 mL of pure water, mixing the mixture by shaking, and then leaving the mixture to stand for 10 minutes at 25° C.

Regarding the imaging with an optical microscope, reflected light was observed at a magnification ratio of 50 times (ocular lens 10 times, object lens 5 times). In a case in which the number of particles per sheet was less than 50, a plurality of sheets of photographs was analyzed, and the numbers were summed.

In regard to the particle analysis with ImageJ, (a) a photograph imaged with an optical microscope is scanned using ImageJ;

(b) the photograph is subjected to a smoothing treatment, a conversion treatment into an 8-bit image, bichromatization on the grayscale, and a makeup treatment;

(c) regarding particles that were overlapping and particles that were cut from the edge of the photograph, since the particles affect the calculation of the degree of circularity, the particles were manually excluded; and (d) in order to eliminate noises, the range of analysis was limited to a particle diameter of 10 μm or more, and the analysis treatment was carried out.

[Viscosity Measurement]

The viscosity at 25° C. was measured using an R215 type viscometer (RE-215L) manufactured by Toki Sangyo Co., Ltd. In a case in which the viscosity was higher than 100 mPa·s, the viscosity was measured with a sample amount of 0.6 mL using a cone rotor for high viscosity (3°×R9.7). In a case in which the viscosity was 100 mPa·s or lower, the viscosity was measured with a sample amount of 0.2 mL using a cone rotor for low viscosity (0.8°×R24). The speed of rotation was set such that the torque index value (TQ) would be stabilized in the range of 50% to 100%, and the viscosity was read out.

[Scanning Electron Microscopic Image of Particle Cross-Section]

For the observation of the particle structure in a swollen state, freeze-dried particles were used. In a freeze-drying step, an aqueous dispersion liquid was produced by mixing 0.2 g of the particles produced in an Example with 20 mL of ultrapure water, mixing the mixture by shaking, and then leaving the mixture to stand for 1 hour. Next, a solvent substitution step of centrifuging the mixture for 10 minutes at 3,000 G, removing the supernatant by decantation, and then adding 20 mL of ethanol was repeated three times, and ethanol-dispersed particles were obtained. Subsequently, a step of removing ethanol by centrifugation and then substituting the solvent with 20 mL of t-butanol was repeated three times, and thus t-butanol-dispersed particles were obtained. Those t-butanol-dispersed particles were frozen at −18° C. or lower, and freeze-drying was carried out by a conventional method. This step was manipulated such that the particle diameter at the time of water dispersion would be almost the same as the particle diameter at the time of t-butanol dispersion.

The freeze-dried particles thus obtained were embedded, and the particles were cut with a microtome. Thereby, cross-sections were exposed. The cross-sections were subjected to a vapor deposition treatment using osmium, and the cross-sections of the vapor deposition-treated freeze-dried particles were measured with a scanning electron microscope equipped with an FE (Field Emission) gun at an operation distance of 8 mm and an accelerating voltage of 2 kV. Thus, images were obtained. On the occasion of obtaining the images, images were selected such that a particle having the cross-section pass through near the center of the particle would be selected. Specifically, images were obtained for particles for which their cross-section diameters were within ±30% of the average particle diameter. Even in a case in which the particles have a core-shell structure, since the core-shell structure is not observable in a case in which edges of the particles are cut. Therefore, it is necessary to select particles appropriately.

Example 41-1

150 g of a 40.0% by mass aqueous solution of polyallylamine (first solution) was produced by distilling off water under reduced-pressure from 400 g of a 15.0% by mass aqueous solution of polyallylamine (PAA-15C manufactured by Nittobo Medical Co., Ltd., amine value 17.5 mmol/g).

318 g of a second solution was produced by dissolving 15.0 g of ethyl cellulose (ETHYL CELLULOSE (about 49% ethoxy) 45 manufactured by Wako Pure Chemical Industries, Ltd., weight-average molecular weight is 125,000) in 303 g of toluene.

The first solution and the second solution were mixed in a 500-mL separable flask equipped with a Dean-Stark Apparatus, and thus a mixture was obtained. The mixture was stirred for 60 minutes at 60° C. at a speed of 120 rotations/minute using a flat type stirring blade made of stainless steel (R1375 manufactured by IKA GmbH & Co., KG, blade diameter 70 mm) and THREE-ONE MOTOR (BL600) manufactured by Shinto Scientific Co., Ltd., and thus a polyallylamine emulsion was obtained.

To the emulsion thus obtained, a solution obtained by diluting 4.08 g of 1,6-dichlorohexane (manufactured by Tokyo Chemical Industry Co., Ltd.) with 10 mL of toluene was added dropwise for 5 minutes. After completion of the dropwise addition, the bath temperature was raised to 120° C., and the mixture was heated to reflux for 4 hours. Thus, 74 mL of water was removed. The flask temperature was cooled to room temperature, and the supernatant was removed by decantation. The particles thus obtained were purified using ethanol (500 mL, three times), a 1 mol/L aqueous solution of NaOH:water (60 mL:440 mL, one time), water (500 mL, two times), and ethanol (500 mL, one time), by repeating re-slurrying and filtration for each of the solvents. The particles thus obtained were dried in a blast dryer for 48 hours at 50° C. and in a vacuum dryer for 12 hours at 70° C., and crosslinked spherical polyallylamine particles were obtained. See the following for the reaction scheme.

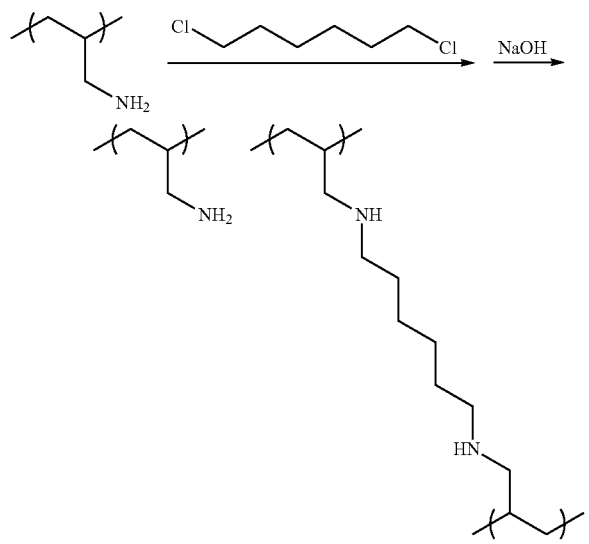

Example 42

180 g of a 40.0% by mass aqueous solution of polyallylamine (first solution) was produced by distilling off water under reduced-pressure from 480 g of a 15.0% by mass aqueous solution of polyallylamine (PAA-15C manufactured by Nittobo Medical Co., Ltd., amine value: 17.5 mmol/g).

382 g of a second solution was produced by dissolving 18.0 g of ethyl cellulose (ETHYL CELLULOSE (about 49% ethoxy) 45 manufactured by Wako Pure Chemical Industries, Ltd., weight-average molecular weight is 125,000) in 364 g of toluene.

The first solution and the second solution were mixed in a 500-mL separable flask equipped with a Dean-Stark apparatus, and thereby a mixture was obtained. The mixture was stirred for 60 minutes at 50° C. at a speed of 120 rotations/minute using a flat type stirring blade made of stainless steel (R1375 manufactured by IKA GmbH & Co., KG, blade diameter 70 mm) and THREE-ONE MOTOR (BL600) manufactured by Shinto Scientific Co., Ltd., and thereby a polyallylamine emulsion was obtained.

To the emulsion thus obtained, a solution obtained by diluting 4.90 g of 1,6-dichlorohexane (manufactured by Tokyo Chemical Industry Co., Ltd.) with 12 mL of toluene was added dropwise for 10 minutes. After completion of the dropwise addition, the mixture was stirred for 2.5 hours, the bath temperature was raised to 120° C., and the mixture was heated to reflux for 4 hours. Thus, 88 mL of water was removed. Subsequently, crosslinked spherical polyallylamine particles were obtained in the same manner as in Example 41-1.

Example 43

Crosslinked spherical polyallylamine particles were obtained in the same manner as in Example 42, except that the temperature at the time of stirring was changed from 50° C. to 80° C.

Example 44

Crosslinked spherical polyallylamine particles were obtained in the same manner as in Example 42, except that the temperature at the time of stirring was changed from 50° C. to 60° C., the mass of 1,6-dichlorohexane was changed from 4.90 g to 9.79 g, and the reflux time was changed from 4 hours to 5.5 hours.

Example 41-2

5 L of water was added to 248 g of the crosslinked spherical polyallylamine particles of Example 41-1, and the mixture was stirred for 30 minutes at room temperature at a speed of 100 rotations/minute. 173 mL of 30% by mass hydrochloric acid (manufactured by Wako Pure Chemical Industries, Ltd.) was added to the suspension thus obtained, and the mixture was stirred for one hour at room temperature at a speed of 100 rotations/minute. The reaction liquid was filtered, and purification was performed by repeating re-slurrifying with water (5 L, two times) and filtration. The particles thus obtained were dried in a blast dryer for 48 hours at 50° C. and in a vacuum dryer for 12 hours at 70° C. Thus, crosslinked spherical polyallylamine particles were obtained.

Example 41-3

3 L of water was added to 150 g of the crosslinked spherical polyallylamine particles of Example 41-1, and the mixture was stirred for 30 minutes at room temperature at a speed of 100 rotations/minute. 105 mL of 30% by mass hydrochloric acid (manufactured by Wako Pure Chemical Industries, Ltd.) was added to the suspension thus obtained, and the mixture was stirred for one hour at room temperature at a speed of 100 rotations/minute. The reaction liquid was filtered, and purification was performed by repeating re-slurrifying with water (3 L, two times) and filtration.

3 L of water and 215 g of sodium carbonate (manufactured by Wako Pure Chemical Industries, Ltd.) were added to the particles thus obtained, and the mixture was stirred for 2 hours at room temperature at a speed of 100 rotations/minute. The reaction liquid was filtered, and purification was performed by repeating re-slurrifying with water (3 L, four times) and filtration. The particles were dried in a blast dryer for 48 hours at 50° C. and in a vacuum dryer for 12 hours at 70° C. Thus, crosslinked spherical polyallylamine particles were obtained.

Example 45

To the emulsion obtained in the same manner as in Example 41-1, a solution obtained by diluting 2.97 g of 1,3-dichloropropane (manufactured by Tokyo Chemical Industry Co., Ltd.) with 10 mL of toluene was added dropwise for 2 hours. After completion of the dropwise addition, the mixture was stirred for 2.5 hours, the bath temperature was raised to 120° C., and the mixture was heated to reflux for 4 hours. Thus, 74 mL of water was removed. Subsequently, crosslinked spherical polyallylamine particles were obtained in the same manner as in Example 41-1.

Example 46

Crosslinked spherical polyallylamine particles were obtained in the same manner as in Example 45, except that the mass of 1,3-dichloropropane was changed from 2.97 g of 2.68 g.

Example 47

Crosslinked spherical polyallylamine particles were obtained in the same manner as in Example 45, except that the mass of 1,3-dichloropropane was changed from 2.97 g to 1.78 g.

Example 48

Crosslinked spherical polyallylamine particles were obtained in the same manner as in Example 45, except that the crosslinking agent was changed from 1,3-dichloropropane to 1,2-dichloroethane, and the mass of the crosslinking agent was changed from 2.97 g to 2.61 g.

Example 49

Crosslinked spherical polyallylamine particles were obtained in the same manner as in Example 45, except that the crosslinking agent was changed from 1,3-dichloropropane to epichlorohydrin, and the mass of the crosslinking agent was changed from 2.97 g to 3.90 g.

Example 50

Crosslinked spherical polyallylamine particles were obtained in the same manner as in Example 49, except that the mass of epichlorohydrin was changed from 3.90 g to 3.17 g.

Example 51

Crosslinked spherical polyallylamine particles were obtained in the same manner as in Example 49, except that the mass of epichlorohydrin was changed from 3.90 g to 2.44 g.

Example 52

75 g of a 40.0% by mass aqueous solution of polyallylamine (first solution) was produced by distilling off water under reduced-pressure from 200 g of a 15.0% by mass aqueous solution of polyallylamine (PAA-15C manufactured by Nittobo Medical Co., Ltd., amine value 17.5 mmol/g).

160 g of a second solution was produced by dissolving 7.50 g of ethyl cellulose (ETHYL CELLULOSE (about 49% ethoxy) 45 manufactured by Wako Pure Chemical Industries, Ltd., weight-average molecular weight is 125,000) in 152 g of toluene.

The first solution and the second solution were mixed in a 500-mL separable flask equipped with a Dean-Stark apparatus, and thus a mixture was obtained. The mixture was stirred for 60 minutes at 60° C. at a speed of 120 rotations/minute using a flat type stirring blade made of stainless steel (R1375 manufactured by IKA GmbH & Co., KG, blade diameter 70 mm) and THREE-ONE MOTOR (BL600) manufactured by Shinto Scientific Co., Ltd., and a polyallylamine emulsion was obtained.

To the emulsion thus obtained, a solution obtained by diluting 1.59 g of trimethylolpropane triglycidyl ether with 10 mL of toluene was added dropwise for 2 hours. Subsequently, crosslinked spherical polyallylamine particles were obtained in the same manner as in Example 41-1.

Example 53

Crosslinked spherical polyallylamine particles were obtained in the same manner as in Example 45, except that the crosslinking agent was changed from 1,3-dichloropropane to ethylene glycol diglycidyl ether, and the mass of the crosslinking agent was changed from 2.97 g to 7.33 g.

Example 54

Crosslinked spherical polyallylamine particles were obtained in the same manner as in Example 45, except that the crosslinking agent was changed from 1,3-dichloropropane to 1,2,3,4-diepoxybutane, and the mass of the crosslinking agent was changed from 2.97 g to 4.53 g.

The production conditions and evaluation results of Examples 41 to 54 are shown in the following tables. The molecular weights in the tables are weight-average molecular weights.

TABLE 6

| | Composition of first solution | Viscosity of first solution (mPa·s) | Hydrophobic solvent | Emulsifier |
|---|---|---|---|---|
| Example 41-1 | 40% by mass aqueous solution of polyallylamine (molecular weight 15,000) | 1377 | Toluene | Ethyl cellulose (4.7% by mass) |
| Example 42 | 40% by mass aqueous solution of polyallylamine (molecular weight 15,000) | 1377 | Toluene | Ethyl cellulose (4.7% by mass) |
| Example 43 | 40% by mass aqueous solution of polyallylamine (molecular weight 15,000) | 1377 | Toluene | Ethyl cellulose (4.7% by mass) |
| Example 44 | 40% by mass aqueous solution of polyallylamine (molecular weight 15,000) | 1377 | Toluene | Ethyl cellulose (4.7% by mass) |
| Example 45 | 40% by mass aqueous solution of polyallylamine (molecular weight 15,000) | 1377 | Toluene | Ethyl cellulose (4.7% by mass) |
| Example 46 | 40% by mass aqueous solution of polyallylamine (molecular weight 15,000) | 1377 | Toluene | Ethyl cellulose (4.7% by mass) |
| Example 47 | 40% by mass aqueous solution of polyallylamine (molecular weight 15,000) | 1377 | Toluene | Ethyl cellulose (4.7% by mass) |
| Example 48 | 40% by mass aqueous solution of polyallylamine (molecular weight 15,000) | 1377 | Toluene | Ethyl cellulose (4.7% by mass) |
| Example 49 | 40% by mass aqueous solution of polyallylamine (molecular weight 15,000) | 1377 | Toluene | Ethyl cellulose (4.7% by mass) |

TABLE 6-continued

| | | | | |
|---|---|---|---|---|
| Example 50 | 40% by mass aqueous solution of polyallylamine (molecular weight 15,000) | 1377 | Toluene | Ethyl cellulose (4.7% by mass) |
| Example 51 | 40% by mass aqueous solution of polyallylamine (molecular weight 15,000) | 1377 | Toluene | Ethyl cellulose (4.7% by mass) |
| Example 52 | 40% by mass aqueous solution of polyallylamine (molecular weight 15,000) | 1377 | Toluene | Ethyl cellulose (4.7% by mass) |
| Example 53 | 40% by mass aqueous solution of polyallylamine (molecular weight 15,000) | 1377 | Toluene | Ethyl cellulose (4.7% by mass) |
| Example 54 | 40% by mass aqueous solution of polyallylamine (molecular weight 15,000) | 1377 | Toluene | Ethyl cellulose (4.7% by mass) |

| | Viscosity of second solution (mPa·s) | Viscosity ratio (first solution/second solution) | Speed of rotation (rotations/minute) |
|---|---|---|---|
| Example 41-1 | 92 | 15 | 120 |
| Example 42 | 92 | 15 | 120 |
| Example 43 | 92 | 15 | 120 |
| Example 44 | 92 | 15 | 120 |
| Example 45 | 92 | 15 | 120 |
| Example 46 | 92 | 15 | 120 |
| Example 47 | 92 | 15 | 120 |
| Example 48 | 92 | 15 | 120 |
| Example 49 | 92 | 15 | 120 |
| Example 50 | 92 | 15 | 120 |
| Example 51 | 92 | 15 | 120 |
| Example 52 | 92 | 15 | 120 |
| Example 53 | 92 | 15 | 120 |
| Example 54 | 92 | 15 | 120 |

TABLE 7

| | Polymer | Crosslinking agent | Degree of circularity | Amount of use of crosslinking agent (% by mass) | Swelling rate (mL/g) | Average particle diameter (μm) |
|---|---|---|---|---|---|---|
| Example 41-1 | Polyallylamine | Dichlorohexane | 0.93 | 3.6 | 12.4 | 56 |
| Example 42 | Polyallylamine | Dichlorohexane | 0.93 | 3.6 | 12.7 | 27 |
| Example 43 | Polyallylamine | Dichlorohexane | 0.91 | 3.6 | 11.7 | 113 |
| Example 44 | Polyallylamine | Dichlorohexane | 0.92 | 6.9 | 8.7 | 49 |
| Example 45 | Polyallylamine | Dichloropropane | 0.91 | 1.8 | 10.6 | 56 |
| Example 46 | Polyallylamine | Dichloropropane | 0.93 | 1.6 | 11.8 | 49 |
| Example 47 | Polyallylamine | Dichloropropane | 0.91 | 1.1 | 15.6 | 52 |
| Example 48 | Polyallylamine | Dichloroethane | 0.94 | 1.2 | 12.9 | 41 |
| Example 49 | Polyallylamine | Epichlorohydrin | 0.93 | 3.9 | 9.7 | 54 |
| Example 50 | Polyallylamine | Epichlorohydrin | 0.91 | 3.2 | 11.9 | 59 |
| Example 51 | Polyallylamine | Epichlorohydrin | 0.92 | 2.5 | 13.4 | 46 |
| Example 52 | Polyallylamine | Trimethylolpropane triglycidyl ether | 0.93 | 5 | 13.7 | 113 |
| Example 53 | Polyallylamine | Ethylene glycol diglycidyl ether | 0.93 | 10.9 | 10.5 | 78 |
| Example 54 | Polyallylamine | Diepoxybutane | 0.94 | 7 | 10.0 | 62 |

In the tables, the amount of use of the crosslinking agent (% by mass) is a value obtained by calculating the proportion occupied by the mass of crosslinking sites excluding the leaving group in the crosslinking agent, in the total mass of the crosslinking agent.

Example 55

Into a 1-L separable flask (cylinder type, inner diameter 120 mm, product No. 6-741-10, manufactured by As One Corporation) equipped with a Dean-Stark apparatus and equipped with a PTFE all-coated stirring rod (twister type, manufactured by Flonchemical Co., Ltd., blade diameter 80 mm) as a stifling blade and THREE-ONE MOTOR (BL600) manufactured by Shinto Scientific Co., Ltd., 8.00 g of ethyl cellulose (ETHYL CELLULOSE 45 (about 49% ethoxy) manufactured by Wako Pure Chemical Industries, Ltd., weight-average molecular weight is 125,000), 1.24 g of 1,6-dichlorohexane (manufactured by Tokyo Chemical Industry Co., Ltd.), 425.9 g of toluene, and 47.3 g of ethanol were introduced, and the mixture was stirred for one hour at 40° C. at a speed of 230 rotations/minute. Thus, ethyl cellulose was completely dissolved. Subsequently, 162 g of a 15.0% by mass aqueous solution of polyallylamine (PAA-15C manufactured by Nittobo Medical Co., Ltd., amine value 17.5 mmol/g) was added dropwise thereto for one hour. The mixture was stirred for 60 minutes at 40° C. at a speed of 200 rotations/minute, and thereby a polyallylamine emulsion was obtained. Subsequently, the bath temperature was raised to 120° C., and the mixture was heated to reflux for 20 hours. Thereby, 180 mL of water was removed.

The flask temperature was cooled to room temperature, and the mixture was filtered and then washed with ethanol. Particles thus obtained were introduced into a beaker, and the particles were stirred with 300 ml of water and 3 ml of a 2 N aqueous solution of NaOH for one hour. Subsequently, the particles were washed five times with 300 ml of water, and then washed with ethanol (300 mL, one time). The particles thus obtained were dried in a vacuum dryer at 70° C. for 20 hours, and thus crosslinked spherical polymer particles were obtained.

Example 56

Into a 500-ml separable flask (cylindrical flat-bottom type manufactured by Sibata Scientific Technology, Ltd., product No. 005820-500) equipped with a Dean-Stark apparatus and equipped with a flat stirring blade made of stainless steel (R1375 manufactured by IKA GmbH & Co., KG, blade diameter 70 mm) as a stirring blade and THREE-ONE MOTOR (BL600) manufactured by Shinto Scientific Co., Ltd., 3.32 g of ethyl cellulose (ETHYL CELLULOSE 45 (about 49% ethoxy) manufactured by Wako Pure Chemical Industries, Ltd., weight-average molecular weight is 125,000), 0.92 g of 1,6-dichlorohexane (manufactured by Tokyo Chemical Industry Co., Ltd.), 237 g of toluene, and 26.3 g of ethanol were introduced, and the mixture was stirred for one hour at 40° C. at a speed of 200 rotations/minute. Thus, ethyl cellulose was completely dissolved. Subsequently, 90 g of a 15.0% by mass aqueous solution of polyallylamine (PAA-15C manufactured by Nittobo Medical Co., Ltd., amine value 17.5 mmol/g) was added dropwise thereto for one hour. The mixture was stirred for 60 minutes at 40° C. at a speed of 200 rotations/minute, and thereby a polyallylamine emulsion was obtained. Subsequently, the bath temperature was raised to 120° C., and the mixture was heated to reflux for 20 hours. Thereby, 88 mL of water was removed. The flask temperature was cooled to room temperature, and the mixture was filtered and then washed with ethanol. Particles thus obtained were introduced into a beaker, and the particles were stirred with 200 ml of water and 2 ml of a 2 N aqueous solution of NaOH for one hour. Subsequently, the particles were washed five times with 200 ml of water, and then washed with ethanol (200 mL, one time). The particles thus obtained were dried in a vacuum dryer at 70° C. for 20 hours, and thus crosslinked spherical polymer particles were obtained.

Example 57

Crosslinked spherical polyallylamine particles were obtained in the same manner as in Example 56, except that the speed of stirring was changed from 200 rotations/minute to 250 rotations/minute, and the mass of ethyl cellulose was changed from 3.32 g to 5.59 g.

Example 58

Crosslinked spherical polyallylamine particles were obtained in the same manner as in Example 55, except that the emulsification temperature was changed from 40° C. to 22° C., the speed of stirring was changed from 200 rotations/minute to 350 rotations/minute, and the mass of ethyl cellulose was changed from 3.32 g to 5.59 g.

Example 59

Crosslinked spherical polyallylamine particles were obtained in the same manner as in Example 55, except that the speed of stirring was changed from 230 rotations/minute to 170 rotations/minute.

Example 60

Crosslinked spherical polyallylamine particles were obtained in the same manner as in Example 55, except that the speed of stirring was changed from 230 rotations/minute to 290 rotations/minute.

Example 61

Crosslinked spherical polyallylamine particles were obtained in the same manner as in Example 56, except that 90 g of a 15.0% by mass aqueous solution of polyallylamine was changed to 90 g of a 22.0% by mass aqueous solution of polyallylamine (PAA-15C manufactured by Nittobo Medical Co., Ltd., amine value 17.5 mmol/g, concentrated from 15 wt %), and the mass of dichlorohexane was changed to 1.01 g, and the mass of ethyl cellulose was changed from 3.32 g to 6.57 g.

Example 62

Crosslinked spherical polyallylamine particles were obtained in the same manner as in Example 56, except that 90 g of a 15.0% by mass aqueous solution of polyallylamine (PAA-15C manufactured by Nittobo Medical Co., Ltd., average molecular weight 15,000) was changed to 90 g of a 15.0% by mass aqueous solution of polyallylamine (PAA-8 manufactured by Nittobo Medical Co., Ltd., average molecular weight 8,000), the mass of dichlorohexane was changed from 0.92 g to 1.00 g, and the mass of ethyl cellulose was changed from 3.32 g to 4.45 g.

Comparative Example 6

The emulsion obtained in Comparative Example 1 was heated to 50° C. and was subjected to a crosslinking reaction for 2 hours. Subsequently, the emulsion was cooled to room temperature and filtered, and then the emulsion was washed sequentially with methanol, water, and a 1 N aqueous solution of NaOH. Subsequently, the emulsion was washed five times with 200 ml of water, and then was dried in a vacuum dryer at 50° C. for 20 hours. Thus, crosslinked spherical polymer particles were obtained.

The production conditions and evaluation results of the Examples described above are shown in the following tables. The molecular weights in the tables are weight-average molecular weights.

TABLE 8

| | Composition of first solution | Viscosity of first solution (mPa · s) | Solvent of second solution | Emulsifier |
|---|---|---|---|---|
| Example 55 | 15% by mass aqueous solution of polyallylamine (molecular weight 15,000) | 21 | Toluene/ethanol = 90/10 | Ethyl cellulose (1.69% by mass) |
| Example 56 | 15% by mass aqueous solution of polyallylamine (molecular weight 15,000) | 21 | Toluene/ethanol = 90/10 | Ethyl cellulose (1.26% by mass) |
| Example 57 | 15% by mass aqueous solution of polyallylamine (molecular weight 15,000) | 21 | Toluene/ethanol = 90/10 | Ethyl cellulose (2.12% by mass) |
| Example 58 | 15% by mass aqueous solution of polyallylamine (molecular weight 15,000) | 21 | Toluene/ethanol = 90/10 | Ethyl cellulose (0.9% by mass) |
| Example 59 | 15% by mass aqueous solution of polyallylamine (molecular weight 15,000) | 21 | Toluene/ethanol = 90/10 | Ethyl cellulose (1.69% by mass) |

TABLE 8-continued

| | | | | |
|---|---|---|---|---|
| Example 60 | 15% by mass aqueous solution of polyallylamine (molecular weight 15,000) | 21 | Toluene/ethanol = 90/10 | Ethyl cellulose (1.69% by mass) |
| Example 61 | 22% by mass aqueous solution of polyallylamine (molecular weight 15,000) | 52.4 | Toluene/ethanol = 90/10 | Ethyl cellulose (2.5% by mass) |
| Example 62 | 15% by mass aqueous solution of polyallylamine (molecular weight 8,000) | 11.8 | Toluene/ethanol = 90/10 | Ethyl cellulose (1.69% by mass) |

| | Viscosity of second solution (mPa · s) | Viscosity ratio (first solution/second solution) | Speed of rotation (rotations/minute) |
|---|---|---|---|
| Example 55 | 3.24 | 6.48 | 230 |
| Example 56 | 2.1 | 10.0 | 200 |
| Example 57 | 4.73 | 4.44 | 250 |
| Example 58 | 1.42 | 14.79 | 350 |
| Example 59 | 3.24 | 6.48 | 170 |
| Example 60 | 3.24 | 6.48 | 290 |
| Example 61 | 6.57 | 7.98 | 200 |
| Example 62 | 3.24 | 3.64 | 200 |

TABLE 9

| | Polymer | Crosslinking agent | Degree of circularity | Amount of use of crosslinking agent (% by mass) | Swelling rate (mL/g) | Average particle diameter (μm) | CV value |
|---|---|---|---|---|---|---|---|
| Example 55 | Polyallylamine | Dichlorohexane | 0.94 | 2.7 | 13.6 | 47 | 35 |
| Example 56 | Polyallylamine | Dichlorohexane | 0.93 | 3.7 | 10.7 | 72 | 76 |
| Example 57 | Polyallylamine | Dichlorohexane | 0.92 | 3.7 | 10.8 | 40 | 49 |
| Example 58 | Polyallylamine | Dichlorohexane | 0.92 | 2.7 | 12.5 | 20 | 32 |
| Example 59 | Polyallylamine | Dichlorohexane | 0.92 | 2.7 | 14.2 | 51 | 50 |
| Example 60 | Polyallylamine | Dichlorohexane | 0.92 | 2.7 | 13 | 48 | 67 |
| Example 61 | Polyallylamine | Dichlorohexane | 0.9 | 2.7 | 11.1 | 79 | 77 |
| Example 62 | Polyallylamine | Dichlorohexane | 0.9 | 4.0 | 11.0 | 67 | 63 |
| Comparative Example 6 | Polyallylamine | Epichlorohydrin | 0.61 | 3.7 | 22 | 553 | 238 |

In the tables, the amount of use of the crosslinking agent (% by mass) is a value obtained by calculating the proportion occupied by the mass of crosslinking sites excluding the leaving group in the crosslinking agent, in the total mass of the crosslinking agent.

The CV values of the average particle diameter of the crosslinked particles in Examples 55 to 62 were lower than the CV value of the average particle diameter of the crosslinked particles in Comparative Example 1. Since the dispersity (CV value) of the average particle diameter of the crosslinked particles was low, it is understood that for an emulsion of a nitrogen atom-containing polymer or a salt thereof obtainable by the method of the embodiment of the present invention, the dispersity of the particle diameter of emulsified particles is also low.

What is claimed is:

1. A method for producing an emulsion of a nitrogen atom-containing polymer or a salt thereof, the method comprising:
a step of mixing a first solution that includes a nitrogen atom-containing polymer or a salt thereof and a hydrophilic solvent and has a viscosity of 10 to 2,000 mPa·s, and a second solution that includes a hydrophobic solvent and has a viscosity of 1 to 100 mPa·s, stirring the mixture, and thus obtaining an emulsion of the nitrogen atom-containing polymer or a salt thereof,
wherein a ratio between the viscosity of the first solution and the viscosity of the second solution is in a range of 0.1:1 to 300:1, and
the second solution includes an emulsifier having a weight-average molecular weight or a number-average molecular weight of 2,000 or more.

2. The method according to claim 1, wherein the viscosity of the first solution is 10 to 1,500 mPa·s.

3. The method according to claim 1, wherein the ratio between the viscosity of the first solution and the viscosity of the second solution is in a range of 0.2:1 to 100:1.

4. The method according to claim 1, wherein an amine value of the nitrogen atom-containing polymer or the salt thereof is 10 mmol/g or more.

5. The method according to claim 1, wherein the nitrogen atom-containing polymer is at least one selected from the group consisting of polyallylamine, a polyalkyleneimine, and polyvinylamine.

6. The method according to claim 1, wherein the nitrogen atom-containing polymer includes polyallylamine.

7. The method according to claim 1, wherein the emulsifier includes a sugar.

8. The method according to claim 1, wherein the emulsifier includes cellulose ether.

9. The method according to claim 1, wherein the hydrophobic solvent is at least one selected from the group consisting of an aromatic hydrocarbon-based solvent, an ester-based solvent, and olive oil.

10. The method according to claim 1, wherein an average particle diameter of emulsified particles of the emulsion of the nitrogen atom-containing polymer or the salt thereof is 1 to 200 μm.

* * * * *